United States Patent
Iyer et al.

(10) Patent No.: US 12,017,301 B2
(45) Date of Patent: Jun. 25, 2024

(54) SYSTEMS AND METHODS FOR COMPRESSION, MANAGEMENT, AND ANALYSIS OF DOWNBEAM CAMERA DATA FOR AN ADDITIVE MACHINE

(71) Applicant: General Electric Company, Schenectady, NY (US)

(72) Inventors: Naresh S. Iyer, Niskayuna, NY (US); Subhrajit Roychowdhury, Niskayuna, NY (US); Christopher D. Immer, Niskayuna, NY (US); Xiaohu Ping, Niskayuna, NY (US); Rogier S. Blom, Clifton Park, NY (US); Jing Yu, Pasadena, CA (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 16/818,650

(22) Filed: Mar. 13, 2020

(65) Prior Publication Data

US 2021/0283717 A1  Sep. 16, 2021

(51) Int. Cl.
*B23K 26/342* (2014.01)
*B23K 26/03* (2006.01)
(Continued)

(52) U.S. Cl.
CPC .......... *B23K 26/342* (2015.10); *B23K 26/032* (2013.01); *B23K 26/0626* (2013.01);
(Continued)

(58) Field of Classification Search
None
See application file for complete search history.

(56) References Cited

U.S. PATENT DOCUMENTS 8,633,421 B2   1/2014   Yoon et al.
9,044,827 B2   6/2015   Song et al.
(Continued)

FOREIGN PATENT DOCUMENTS

EP    2585248 B1 * 10/2017 ........... G06T 7/0004
JP    2018507325 A * 3/2018 ............ B33Y 10/00
(Continued)

OTHER PUBLICATIONS

Machine translation of JP 2018507325 A performed on Apr. 20, 2022, Fan et al. (Year: 2018).*
(Continued)

*Primary Examiner* — Dana Ross
*Assistant Examiner* — Kevin Guanhua Wen
(74) *Attorney, Agent, or Firm* — Hanley, Flight & Zimmerman, LLC

(57) ABSTRACT

An example additive manufacturing apparatus includes an energy source to melt material to form a component in an additive manufacturing process, a camera aligned with the energy source to obtain image data of the melted material during the additive manufacturing process, and a controller to control the energy source during the additive manufacturing process in response to processing of the image data. The controller adjusts control of the energy source based on a correction determined by: applying an artificial intelligence model to image data captured by a camera during an additive manufacturing process, the image data including an image of a melt pool of the additive manufacturing process; predicting an error in the additive manufacturing process using an output of the artificial intelligence model; and compensating for the error by generating a correction to adjust a configuration of the energy source during the additive manufacturing process.

21 Claims, 10 Drawing Sheets

(51) Int. Cl.
  *B23K 26/06*    (2014.01)
  *B23K 26/073*   (2006.01)
  *B23K 26/082*   (2014.01)
  *B23K 31/00*    (2006.01)
  *B33Y 10/00*    (2015.01)
  *B33Y 30/00*    (2015.01)
  *B33Y 50/02*    (2015.01)

(52) U.S. Cl.
  CPC .......... *B23K 26/073* (2013.01); *B23K 26/082* (2015.10); *B23K 31/003* (2013.01); *B23K 31/006* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 9,056,368 | B2 | 6/2015 | Stork Genannt Wersborg |
| 9,259,801 | B2 | 2/2016 | Schurmann |
| 9,492,886 | B2 | 11/2016 | Stork Genannt Wersborg |
| 9,999,924 | B2 | 6/2018 | Dave et al. |
| 10,234,848 | B2 | 3/2019 | Mehr et al. |
| 10,449,619 | B2 | 10/2019 | Williams et al. |
| 10,500,675 | B2 * | 12/2019 | Cheverton et al. .... B23K 26/03 219/121.63 |
| 2015/0048064 | A1 | 2/2015 | Cheverton et al. |
| 2015/0165683 | A1 | 6/2015 | Cheverton et al. |
| 2016/0158889 | A1 | 6/2016 | Carter et al. |
| 2016/0320771 | A1* | 11/2016 | Huang ............... G05B 19/4099 |
| 2018/0174275 | A1* | 6/2018 | Bourdev et al. .......... G06T 5/00 |
| 2018/0341248 | A1* | 11/2018 | Mehr et al. ........ G05B 19/4099 |
| 2019/0054700 | A1* | 2/2019 | Chandar et al. ...... B29C 64/393 |
| 2019/0227525 | A1 | 7/2019 | Mehr et al. |

FOREIGN PATENT DOCUMENTS

| | | | | |
|---|---|---|---|---|
| JP | 2019192714 | A | * 10/2019 | ......... B23K 26/0626 |
| WO | WO 02080081 | A1 | * 10/2002 | ............. G06F 19/00 |
| WO | WO 2017085468 | A1 | * 5/2017 | ............. B22F 3/105 |

OTHER PUBLICATIONS

Machine translation of JP 2019192714 A performed on Apr. 21, 2022, Yamaguchi et al. (Year: 2019).*
Machine translation of JP 2018507325 A performed on Apr. 27, 2023, Fan et al. (Year: 2018).*
Machine translation of EP 2585248 B1 performed on Oct. 30, 2023, Stork et al. (Year: 2017).*
Jäger M. et al.: "Principal Component Imagery for the Quality Monitoring of Dynamic Laser Welding Processes", IEEE Transactions on Industrial Electronics, vol. 5, No. 4, Apr. 2009, pp. 1307-1313, XP011248710, ISSN: 0278-006 (Year: 2009).*
European Patent Office,"Extended Search Report," issued in connection with EP patent application No. 21161864, dated Jul. 9, 2021, 11 pages.
Zhang Yingjie et al, "Extraction and evaluation of melt pool, plume and spatter information for powder-bed fusion AM process monitoring", Materials & Design, Elsevier, Amsterdam, NL, (Jul. 3, 2018), vol. 156, doi:10.1016/J.MATDES.2018.07.002, ISSN 0264-1275, pp. 458-469, XP085440308 [I] 1-15. Abstract only.
Anonymous, "Autoencoder", Wikipedia, (Mar. 8, 2020), URL: https://en.wikipedia.org/w/index.php?title=Autoencoder&oldid=944565627, (Aug. 19, 2020), XP055723696 [A] 5,6, 8 pages.
Xinbo Qi et al., "Applying Neural-Network-Based Machine Learning to Additive Manufacturing: Current Applications, Challenges, and Future Perspectives", Engineering,, (Jul. 3, 2019), vol. 5, No. 4, doi:https://doi.org/10.1016/j.eng.2019.04.012, pp. 721-729, XP002796699 [A] 1-15.
Fathizadan Sepehr et al, "Deep representation learning for process variation management in laser powder bed fusion", Additive Manufacturing, NL, (Apr. 5, 2021), vol. 42, doi:10.1016/j.addma.2021.101961, ISSN 2214-8604, p. 101961, XP055818750 [T] http:/dx.doi.org/10.1016/j.addma.2021.101961, Abstract only.

* cited by examiner

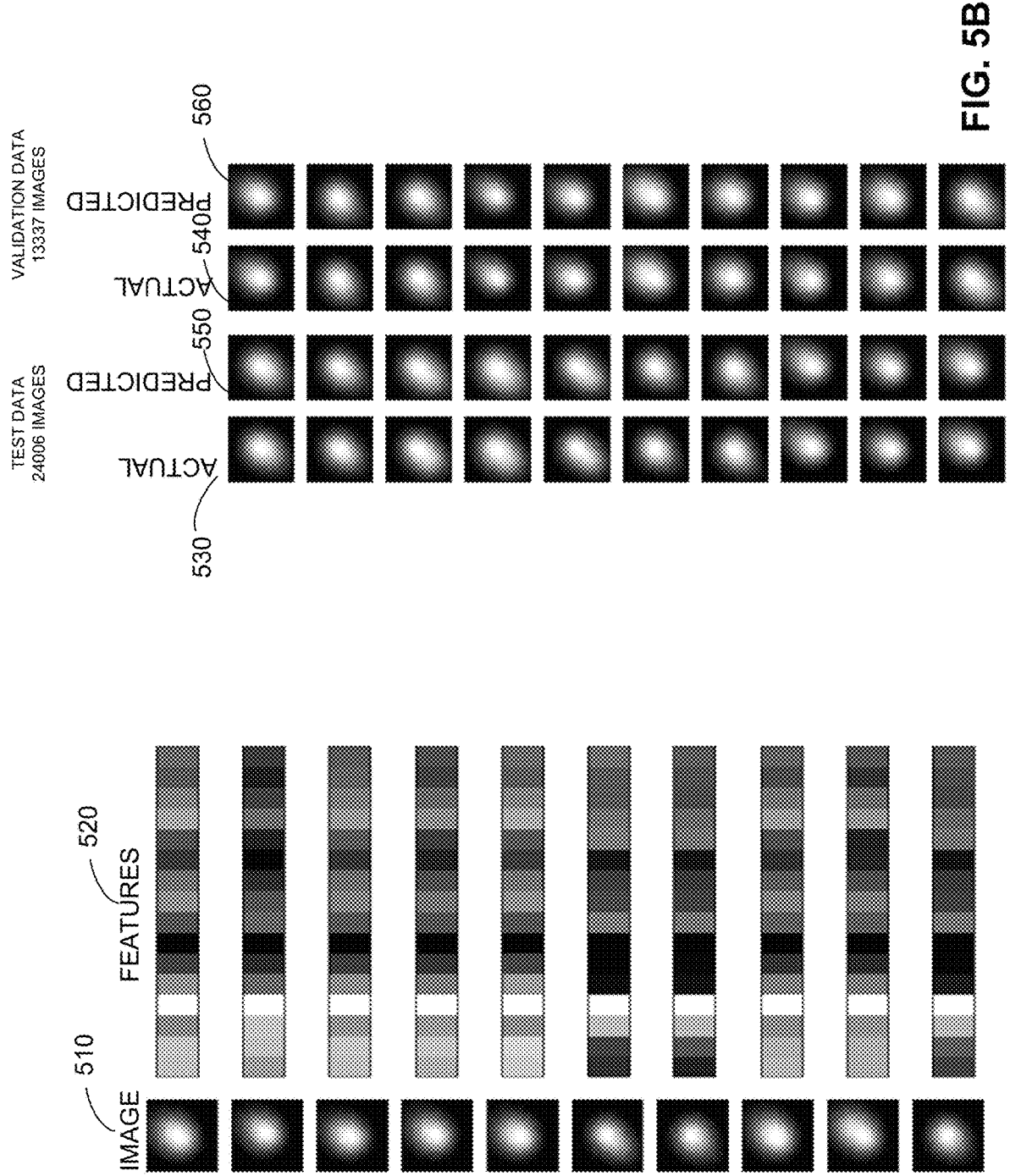

SYSTEMS AND METHODS FOR COMPRESSION, MANAGEMENT, AND ANALYSIS OF DOWNBEAM CAMERA DATA FOR AN ADDITIVE MACHINE

FIELD OF THE DISCLOSURE

This disclosure relates generally to additive manufacturing and, more particularly, to systems and methods for compression, management, and analysis of downbeam camera data for an additive machine.

BACKGROUND

Additive manufacturing is a process by which a three-dimensional structure is built, usually in a series of layers, based on a digital model of the structure. While some examples of additive manufacturing technology rely on sintering or melting/fusing using an energy source to form the structure, rather than "printing", in which material is deposited at select locations, the term "print" is often used to describe the additive manufacturing process (e.g., three-dimensional (3D) printing, 3D rapid prototyping, etc.). Examples of additive manufacturing techniques include Fused Deposition Modeling, Electron Beam Melting, Laminated Object Manufacturing, Selective Laser Sintering (including Direct Metal Laser Sintering, also referred to as Direct Metal Laser Melting or Selective Laser Melting), and Stereolithography, among others. Although 3D printing technology is continually developing, the process to build a structure layer-by-layer is complex, inefficient, and prone to failure. An error in the 3D process can lead to weakness or failure in the manufactured part and, therefore, waste, risk, and other unreliability.

BRIEF DESCRIPTION OF THE DRAWINGS

FIG. 5A illustrates an example conversion of images to image features.

FIG. 5B shows an example comparison of actual and predicted image feature vectors.

The figures are not to scale. Wherever possible, the same reference numbers will be used throughout the drawing(s) and accompanying written description to refer to the same or like parts.

BRIEF SUMMARY

Figure 1:
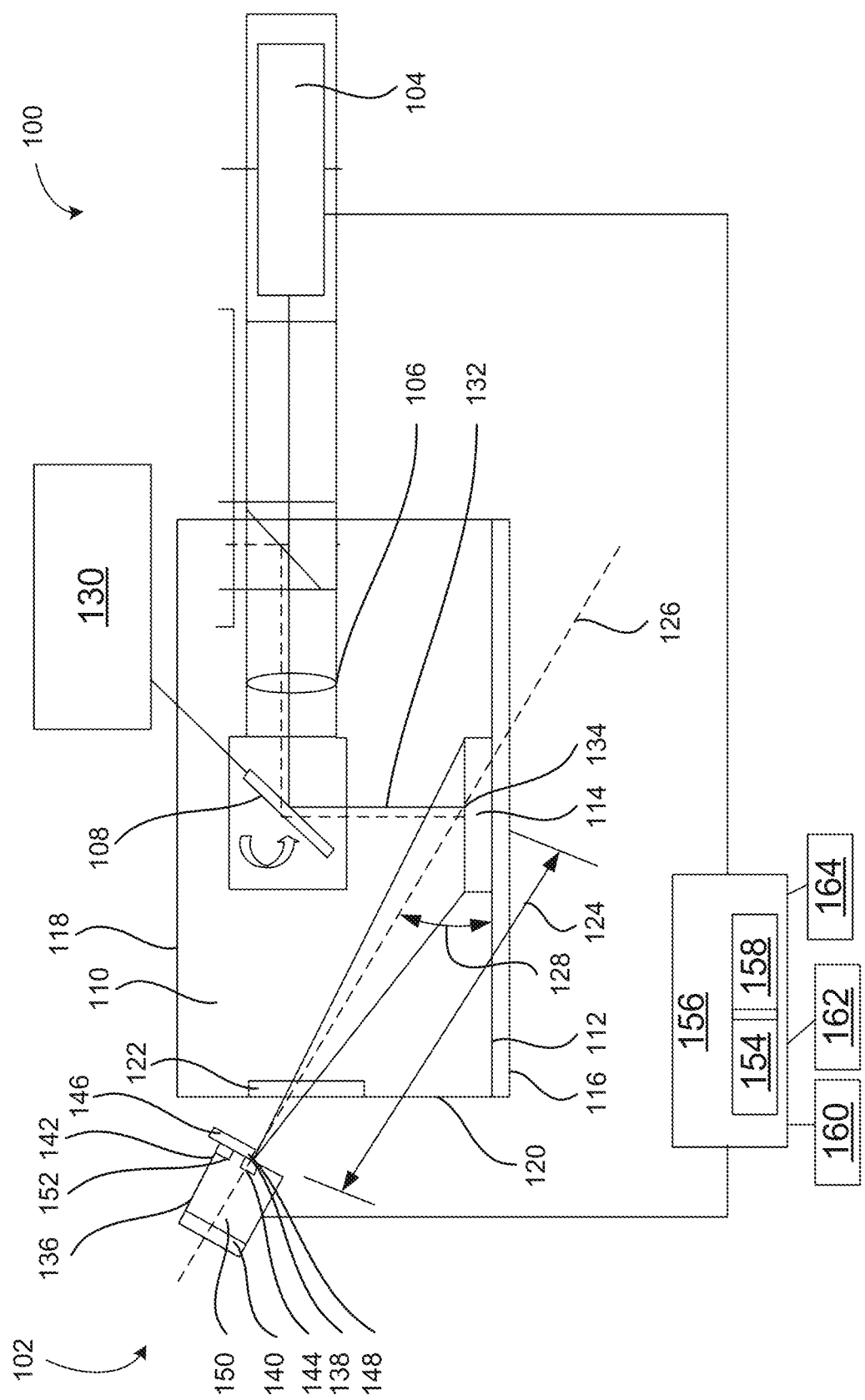
FIG. 1 depicts one example of an additive manufacturing apparatus that can be used in connection with systems and methods disclosed and described herein.

Certain examples disclose and describe apparatus and methods to analyze image data of an additive manufacturing process to manage an associated additive machine during the ongoing additive manufacturing process.

Certain examples provide an apparatus including memory to store instructions and at least one processor. The at least one processor is to execute the instructions to at least: extract image features from image data to represent the image data as a set of image features, the image data captured by a camera during an additive manufacturing process and including an image of a melt pool of the additive manufacturing process; apply an artificial intelligence model to the set of image features; predict an error in the additive manufacturing process using an output of the artificial intelligence model; and compensate for the error by adjusting a configuration of the apparatus during the additive manufacturing process.

Certain examples provide a method including extracting, by executing an instruction using at least one processor, image features from the image data to represent the image data as a set of image features, the image data captured by a camera during an additive manufacturing process and including an image of a melt pool of the additive manufacturing process. The example method includes applying, by executing an instruction using at least one processor, an artificial intelligence model to the set of image features. The example method includes predicting, by executing an instruction using the at least one processor, an error in the additive manufacturing process using an output of the artificial intelligence model. The example method includes compensating for the error by adjusting, by executing an instruction using the at least one processor, a configuration of the additive manufacturing process.

Certain examples provide an additive manufacturing apparatus including an energy source to melt material to form a component in an additive manufacturing process. The example apparatus includes a camera aligned with the energy source to obtain image data of the melted material during the additive manufacturing process. The example apparatus includes a controller to control the energy source during the additive manufacturing process in response to processing of the image data. The controller is to adjust control of the energy source based on a correction determined by: extracting image features from image data to represent the image data as a set of image features, the image data captured by the camera during the additive manufacturing process and including an image of a melt pool formed from the melted material in the additive manufacturing process; applying an artificial intelligence model to the set of image features; predicting an error in the additive manufacturing process using an output of the artificial intelligence model; and compensating for the error by generating a correction to adjust a configuration of the energy source during the additive manufacturing process.

DETAILED DESCRIPTION

Additive manufacturing is a process that enables highly customizable, dynamically deliverable parts manufacturer at a variety of locations. However, the flexible nature of an additive manufacturing process exposes that process to environmental variability, material quality fluctuation, programming/configuration glitches, etc. To address these and other issues, certain examples provide a new, improved monitoring and control system for additive manufacturing. Certain examples provide dynamic, reliable adjustment of an ongoing additive manufacturing process by an additive manufacturing apparatus to improve product yield, reduce waste, and strengthen product reliability through real-time monitoring, processing, and adjustment of an additive manufacturing process for the product. For example, the improved additive manufacturing system captures in-process image data, analyzes the image data to understand system behavior and process status, and adjusts itself to reduce or avoid a defect, anomaly, or other error in manufacturing.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

In addition, it should be understood that references to "one embodiment" or "an embodiment" of the present disclosure are not intended to be interpreted as excluding the existence of additional embodiments that also incorporate the recited features.

Overview

The phrase "additive manufacturing apparatus" is used interchangeably herein with the phrase "printing apparatus" and term "printer", and the term "print" is used interchangeably herein with the word "build", referring to an action to build a structure using an additive manufacturing apparatus, regardless of the particular additive manufacturing technology being used to form the structure. As used herein, print and printing refer to the various forms of additive manufacturing and include three-dimensional (3D) printing or 3D rapid prototyping, as well as sintering or melting/fusing technologies. Examples of additive manufacturing or printing techniques include Fused Deposition Modeling, Electron Beam Melting, Laminated Object Manufacturing, Selective Laser Sintering (including Direct Metal Laser Sintering also referred to as Direct Metal Laser Melting or Selective Laser Melting), and Stereolithography among others.

For example, selective laser melting (SLM), also known as direct metal laser melting (DMLM), Direct Metal Laser Sintering (DMLS), or laser powder bed fusion (LPBF), is a rapid prototyping, 3D printing, or additive manufacturing (AM) technique designed to use a high power-density laser to melt and fuse metallic powders together. The SLM process can fully melt the metal material into a solid three-dimensional part, for example.

SLM is a part of additive manufacturing in which a high power density laser is used to melt and fuse metallic powders together. With SLM, thin layers of atomized fine metal powder are evenly distributed onto a substrate plate (e.g., a metal, etc.) using a coating mechanism. The substrate plate is fastened to an indexing table that moves in the vertical (Z) axis. This takes place inside a chamber containing a tightly controlled atmosphere of inert gas, either argon or nitrogen at oxygen levels below 500 parts per million, for example. Once each layer has been distributed, each two-dimensional (2D) slice of the part geometry is fused by selectively melting the powder. Melting of the powder is accomplished with a high-power laser beam, such as an ytterbium (Yb) fiber laser with hundreds of watts, etc. The laser beam is directed in the X and Y directions with two high frequency scanning mirrors. The laser energy is intense enough to permit full melting (welding) of the particles to form solid metal. The process is repeated layer after layer until the part is complete.

Direct Metal Laser Melting (DMLM) or Direct Metal Laser Sintering (DMLS) are particular type(s) of SLM that use a variety of alloys and allows prototypes to be functional hardware made out of the same material as production components. Since the components are built layer by layer, it is possible to design organic geometries, internal features, and challenging passages that could not be cast or otherwise machined. For example, DMLS produces strong, durable metal parts that work well as functional prototypes and/or end-use production parts, for example.

The DMLS process begins by slicing 3D computer-aided design (CAD) file data into layers (e.g., from 20 to 100 micrometers thick, 30-120 µm thick, 50-150 µm thick, etc.), creating a two-dimensional (2D) image of each layer. For example, a format of the 3D CAD file is a .stl file used on most layer-based 3D printing or stereolithography technologies. This file is then loaded into a file preparation software package that assigns parameters, values and physical supports that allow the file to be interpreted and built by different types of additive manufacturing machines, for example.

The DMLS machine uses a high-powered 200 watt Yb-fiber optic laser, for example. The machine includes a build chamber area including a material dispensing platform and a build platform along with a re-coater blade used to move new powder over the build platform. The technology fuses metal powder into a solid part by melting it locally using the focused laser beam. A melt pool is formed when the powder melts from exposure to the laser beam radiation. Parts are built up additively layer by layer (e.g., using layers 10 micrometers thick, 20 µm thick, 30 µm thick, 50 µm thick, etc.). The machine can include and/or operate with monitoring and control systems and methods, such as iterative learning control, continuous autocalibration, and real-time melt pool monitoring, etc., to introduce a step change in the build process performance and stability, for example. Certain examples enable melt pool monitoring, iterative learning control, continuous auto-calibration, real-time melt pool control, etc.

Other additive manufacturing methods, such as Electron Beam Melting (EBM), can be used for crack-prone metal alloys, such as titanium, etc. With EBM, high-performance electron beam sources and in-situ process monitoring using "self-generated" x-ray imaging and backscatter electron technologies can be used for improved quality control. A binder jet allows fast printing at lower cost with novel support structure designs and clean-burning binders to solve two key technology challenges of sintering distortion and material properties to enable additive manufacturing for automotive, other transportation solutions, powder generation, etc.

Certain examples improve management and analysis of complex, high-dimensional, high-volume, camera data generated by an additive printing machine during a 3D printing process. Example camera data includes an in situ video capture of the 3D printing process, which enables capture of in situ melt pool characteristics. Analysis of such in situ melt pool characteristics can reveal insights about compliance of a build process with a plan, schematic, model, material tolerance, etc., including identification of deviation from desired build characteristics, etc. Upon discovering a deviation, certain examples provide a 3D printing process that can be rapidly brought back into compliance in situ through compensation and/or other adjustment of associated process parameter(s) using a controller. As such, certain examples provide a real time (or substantially real time given data processing, transmission, and/or storage latency, etc.) check on the quality of a part being built to correct or adjust printing that could otherwise lead to formation of defective characteristic(s) in the part.

In situ quality control of a 3D printing or additive manufacturing process presents multiple challenges. For example, such quality control is complex due to size of captured data as well as a rate at which the data grows. Other challenges include managing storage of such data over time, in situ analysis of such data in a time-efficient manner to enable in situ compensation, an ability to deploy such analysis into a limited ecosystem of compute and memory resources available to a 3D printer controller, an ability to index such data so as to tie the data to accurate spatio-temporal co-ordinates, an ability to accommodate variability induced from multiple environmental and process-independent factors when performing such analyses, etc. Certain examples address these challenges.

Certain examples provide a deep learning based, under-complete autoencoder to reduce dimensionality of a camera image by multiple orders of magnitude while retaining an ability to reconstruct images with low error. Certain examples provide an analytical process to convert captured video into relevant image frames to preserve critical information (e.g., only the most relevant frames required to preserve critical information, etc.). Certain examples provide region-growing based image preprocessing to segment a melt pool in an overall image frame. Certain examples provide in situ analytics, deployed in a machine on-board system, to process camera data to produce insights, including process deviations, etc. Certain examples provide a storage mechanism to efficiently deposit a low-dimensional autoencoder representation of a generated image on a machine-edge and the cloud. Certain examples provide analytics to perform analyses on a compressed representation to generate ex situ insights that can augment information into the in situ insights towards better overall fidelity.

In certain examples, a machine vision-based process monitoring system can be used to monitor the building of layers of one or more objects by an additive manufacturing apparatus, and, in some examples, to detect operational flaws as they occur, (e.g., during the build process rather than afterward). In other examples, evaluation/analysis of images acquired during the build process is performed as part of post-processing (and not as part of the real-time acquisition of images). Real-time acquisition as used herein refers to the image capture of individual layer(s) of the structure as the structure is being built ("printed"). Real-time analysis refers to evaluation of the acquired images of the various layers.

Operational flaws may include, as examples, errors with the structure(s), build process, or additive manufacturing apparatus, or indicators that one or more errors are likely to occur with the structure(s), build process, or additive manufacturing apparatus. Flaws can include errors or anomalies in the melt pool. In some embodiments, action(s) may be taken responsive to observing that an operational flaw has occurred. For instance, remedial actions may be taken so that the flaw can be corrected, the build process stopped, the problem fixed, a new build started, etc.

An example additive manufacturing apparatus 100 is illustrated in FIG. 1 in the context of printed disposable dies for casting of parts. The disposable core dies in this example are built out of melted polymer or melted metal material, although other materials are possible. Example additive manufacturing apparatus can include SLM, DMLM, DMLS, EBD, laser direct metal deposition (LDMD), laser metal deposition (LMD), laser net shape manufacturing (LNSM) deposition, and/or other additive manufacturing apparatus involving a melt pool. The example additive manufacturing apparatus 100 is illustrated in the example of FIG. 1 as a DMLM system.

According to aspects described herein, an imaging system is leveraged for monitoring of build quality and machine health during an additive manufacturing process to build a structure, so that the quality of the structure being built, and the health of the additive manufacturing apparatus can be assessed. Aspects of the monitoring and analyzing can be performed in real-time, e.g. during the build process.

In certain examples, additive manufacturing systems, such as Direct Metal Laser Melting (DMLM) systems, include a focused energy source and an imaging device. During operation of the focused energy source, the imaging device generates a time exposure image of a melted particulate forming a melt pool. In some examples, substantially the entire melt pool is captured in the time exposure image. The time exposure image illustrates intensity of light emitted throughout the melt pool. In some examples, the time exposure image is inspected to determine variations and defects in the additive manufacturing process. As a result, errors in the additive manufacturing process are corrected and the process is improved. In some examples, the time exposure image is used in a feed-forward process to improve the manufacturing of subsequent components.

Example Additive Manufacturing Apparatus

FIG. 1 depicts one example of an additive manufacturing apparatus that can be used in connection with systems and methods disclosed and described herein. FIG. 1 is a schematic view of an example additive manufacturing system 100 including an imaging device 102. In the example of FIG. 1, the additive manufacturing system 100 is a direct metal laser melting (DMLM) system. The example additive manufacturing system 100 further includes a focused energy source 104 (e.g., a laser, etc.) optically coupled to optics 106 and one or more galvanometers 108 to control the scanning of a focused energy source 104. In the example of FIG. 1, the focused energy source 104 is a laser device. In alternative examples, the additive manufacturing system 100 includes any focused energy source(s) 104 that enable additive manufacturing system 100 to operate as described herein. For example, the additive manufacturing system 100 can include a first focused energy source 104 having a first power and a second focused energy source 104 having a second power different from the first power. In further examples, the additive manufacturing system 100 has at least two focused energy sources 104 having substantially the same power output. In further examples, the additive manufacturing system 100 includes at least one focused energy source 104 that is an electron beam generator.

In the example of FIG. 1, the additive manufacturing system 100 includes a housing 110 defining a surface 112 configured to hold a particulate 114 (e.g., powdered metal, polymer, etc.). The housing 110 includes a bottom wall 116 defining a surface 112, a top wall 118 opposite the bottom wall 116, and a sidewall 120 at least partially extending between the bottom wall 116 and the top wall 118. In alternative examples, the housing 110 includes any walls and surfaces that enable the additive manufacturing system 100 to operate as described herein. In the example of FIG. 1, a sidewall 120 defines a viewport 122 therein. In other examples, the viewport 122 is defined by any portion of the housing 110 that enables the additive manufacturing system 100 to operate as described herein. For example, the viewport 122 can be at least partially defined the by top wall 118. In some examples, the housing 110 defines a plurality of viewports 122.

In the example of FIG. 1, the imaging device 102 (e.g., a camera, scanner, etc.) is positioned adjacent the viewport 122 on the exterior of housing 110. An image axis 126 extends between the imaging device 102 and the particulate 114 on the surface 112. Accordingly, in the example of FIG. 1, the image axis 126 extends through the viewport 122. The imaging device 102 is spaced a distance 124 from the surface 112 measured along the image axis 126. In particular, the image axis 126 extends through an aperture 148 of the imaging device 102. In the example of FIG. 1, the image axis 126 makes an angle 128 with the surface 112.

As used herein, the term "field of view" refers to an extent of an object that the imaging device 102 captures in an image. In the example of FIG. 1, the field of view of the imaging device 102 is in reference to the surface 112 and depends on a position and orientation of the imaging device 102 in relation to the surface 112. The field of view of the imaging device 102 is adjusted by adjusting components of the imaging device 102, such as the optics 106, etc., and the distance between the surface 112 and the imaging device 102.

In the example of FIG. 1, the additive manufacturing system 100 also includes a computer control system, or controller 130. The galvanometer(s) 108 are controlled by the controller 130 and deflect a beam 132 of the focused energy source 104 along a predetermined path on the surface 112. In some examples, the galvanometers 108 include two-dimension (2D) scan galvanometers, three-dimension (3D) scan galvanometers, dynamic focusing galvanometers, and/or any other galvanometer system that deflects the beam 132 of the focused energy source 104. In some examples, the galvanometers 108 deflect a plurality of beams 132 along at least one predetermined path.

The example additive manufacturing system 100 is to fabricate a component 134 by a layer-by-layer manufacturing process. The component 134 is fabricated from an electronic representation of a 3D geometry of the component 134. In some examples, the electronic representation is produced in a computer aided design (CAD) or similar file. In other examples, the electronic representation is any electronic representation that enables the additive manufacturing system 100 to operate as described herein. In the example of FIG. 1, the CAD file associated with the component 134 is converted into a layer-by-layer format that includes a plurality of build parameters for each layer. In the example of FIG. 1, the component 134 is arranged electronically in a desired orientation relative to an origin of a coordinate system used in the additive manufacturing system 100. The geometry of the component 134 is sliced or otherwise divided into a stack of layers of a desired thickness, such that the geometry of each layer is an outline of the cross-section through the component 134 at that particular layer location. A "toolpath" or "toolpaths" are generated across the geometry of a respective layer. The build parameters are applied along the toolpath or toolpaths to fabricate that layer of the component 134 from the material used to construct the component 134. These actions are repeated for each respective layer of component 134 geometry. Once the process is completed, an electronic computer build file (or files) is generated including all of the layers. The build file is loaded into the controller 130 of the additive manufacturing system 100 to control the system during fabrication of each layer to form the component 134.

After the build file is loaded into the controller 130, the additive manufacturing system 100 is operated to generate the component 134 by implementing a layer-by-layer manufacturing process, such as a DMLM method, LMD method, EBM method, etc. The example layer-by-layer additive manufacturing process does not use a pre-existing article as a precursor to the final component 134. Rather, the process produces the component 134 from a raw material in a configurable form, such as the particulate 114 (e.g., heating to form a melt pool of the particulate 114, etc.). For example, without limitation, a steel component is additively manufactured using a steel powder. The additive manufacturing system 100 enables fabrication of components using a broad range of materials, for example, without limitation, metals, ceramics, and polymers. In other examples, DMLM, etc., fabricates components from any materials that enable the additive manufacturing system 100 to operate as described herein.

As used herein, the term "parameter" refers to one or more characteristics that are used to define the operating conditions of the additive manufacturing system 100, such as a power output of the focused energy source 104, a vector scanning speed of the focused energy source 104, a raster power output of the focused energy source 104, a raster scanning speed of the focused energy source 104, a raster tool path of the focused energy source 104, and/or a contour power output of the focused energy source 104 within the additive manufacturing system 100. In some examples, the parameters are initially input by a user into the controller 130 and/or configured via a parameter file, input set of parameters, etc. The parameters represent a given operating state of the additive manufacturing system 100. In general, during raster scanning, the beam 132 is scanned sequentially along a series of substantially straight lines spaced apart and parallel to each other. During vector scanning, the beam 132 is generally scanned sequentially along a series of substantially straight lines or vectors, where the orientations of the vectors relative to each other sometimes varies. In general, an ending point of one vector coincides with the beginning point of the next vector. Vector scanning is generally used to define the outer contours of a component, whereas raster scanning is generally used to "fill" the spaces enclosed by the contour, where the component 134 is solid, for example.

In the example of FIG. 1, the imaging device 102 includes a camera 136 including a lens 138, a sensor 140, a casing 142, a filter 144, and a shutter 146. The casing 142 defines an aperture 148 for light to enter an interior space 150 defined by the casing 142. The lens 138, the filter 144, and the shutter 146 are disposed adjacent the aperture 148. The lens 138 directs and focuses light on the sensor 140, which is disposed in the interior space 150. The filter 144 filters light and inhibits overexposure of the sensor 140. In the example of FIG. 1, the filter 144 is configured to reduce the intense light emitted by the focused energy source 104. In other examples, the camera 136 includes other components that enable the imaging device 102 to operate as described herein.

In the example of FIG. 1, the shutter 146 is positionable between an open position that allows light to travel through the aperture 148 and a closed position that inhibits light traveling through the aperture 148. In this example, the shutter 146 is configured to be maintained in the open position and in the closed position for predetermined periods of time. For example, the shutter 146 moves between the open position and the closed position in a sequence of exposures that are configured to generate a time exposure image. The sequence of exposures reduces the amount of stray light from adjacent portions of the build that is included in the time exposure image. As a result, the time exposure image generated from a sequence of exposures can be more detailed with than an image generated from an exposure with the shutter maintained in the open position.

In the example of FIG. 1, the imaging device 102 includes a trigger 152 to control exposure of the sensor 140 to light. The trigger 152 facilitates positioning of the shutter 146 in the open position such that the sensor 140 is exposed to sufficient light to generate a time exposure image. In other examples, the trigger 152 is any mechanism that enables the imaging device 102 to operate as described herein. In the example of FIG. 1, the trigger 152 receives a signal relating to an operating characteristic of the focused energy source 104. For example, the trigger 152 receives a signal at the commencement and completion of a layer build. In some examples, the trigger 152 receives a signal based on an amount of light in the melt pool during operation of the focused energy source 104. In some examples, the trigger 152 receives signals based on input data, sensor information, and/or other information that enables the imaging device 102 to operate as described herein. In some examples, based on the received signals, the trigger 152 causes the shutter 146 to move to the open position or the closed position and remain in the selected position for a predetermined time period or until the trigger 152 receives another signal.

During operation of the imaging device 102, the shutter 146 is positioned in the open position such that light is allowed to travel through the aperture 148 and strike the sensor 140. The light activates the sensor 140 and is converted to electronic signals. In the example of FIG. 1, the sensor 140 includes a plurality of pixels (not shown) that are activated by light. In other examples, the sensor 140 is any sensor that enables the imaging device 102 to operate as described herein. In the example of FIG. 1, the shutter 146 is moved from the open position to the closed position and an image is generated based on the exposure of the sensor 140 while the shutter 146 is in the open position. In other examples, the shutter 146 is moved between the open position and the closed position while the shutter 146 is exposed to light. The time exposure image is generated based on a cumulative exposure of the sensor 140 and/or based on digitally summing distinct exposures. In the example of FIG. 1, the image is transmitted to a processor 154 coupled to the camera 136. In some examples, the processor 154 is configured to recognize differences in light intensity in the image.

In the example of FIG. 1, the shutter 146 is moved to the open position prior to generation of the beam 132 by the focused energy source 104. The shutter 146 is maintained in the open position such that the sensor 140 is activated by light emitted from the melt pool as the beam 132 moves along the melt pool, for example. When the shutter 146 is moved to the closed position, a time exposure image of the melt pool is generated. In other examples, the shutter 146 is moved to the open position and the closed position at any times that enable the additive manufacturing system 100 to operate as described herein (e.g., through constant still and/or video image capture, etc.). In some examples, the shutter 146 is moved to the open position after activation of the focused energy source 104 and moved to the closed position prior to deactivation of the focused energy source 104.

In the example of FIG. 1, the controller 130 is a controller provided by a manufacturer of the additive manufacturing system 100 to control operation of the additive manufacturing system 100. In some examples, the controller 130 is a computer system that includes at least one processor and at least one memory device. In some examples, the controller 130 includes a 3D model and/or other file representing the component 134 to be fabricated by the additive manufacturing system 100. In some examples, the controller 130 executes operations to control the operation of the additive manufacturing system 100. Operations executed by the controller 130 include controlling power output of the focused energy source 104 and adjusting the galvanometers 108 to control the scanning speed of the focused energy source 104 within the additive manufacturing system 100.

In the example of FIG. 1, a computing device 156 is coupled to the imaging device 102 and the focused energy source 104. The computing device 156 includes a memory or other storage device 158 and a processor 154 coupled to the memory device 158. In some examples, the processor 154 includes one or more processing units, such as, without limitation, a multi-core configuration. In the example of FIG. 1, the processor 154 includes a field programmable gate array (FPGA). Alternatively, the processor 154 is any type of processor that permits the computing device 156 to operate as described herein. In some examples, executable instructions are stored in the memory device 158. The computing device 156 is configurable to perform one or more operations described herein by programming the processor 154. For example, the processor 154 is programmed by encoding an operation as one or more executable instructions and providing the executable instructions in the memory device 158. In the example of FIG. 1, the memory device 158 includes one or more devices that enable storage and retrieval of information such as executable instructions and/or other data. In some examples, the memory device 158 (also referred to as a memory circuit, storage device, or memory) includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are examples only and are thus not limiting as to the types of memory usable for storage of a computer program.

In some examples, the memory device 158 is configured to store build parameters including, without limitation, real-time and historical build parameter values, and/or other type of data. In the example of FIG. 1, the memory device 158 stores images generated by the imaging device 102. In other examples, the memory device 158 stores data that enables the additive manufacturing system 100 to operate as described herein. In some examples, the processor 154 removes or "purges" data from the memory device 158 based on the age of the data. For example, the processor 154 (also referred to as processor circuitry, processing circuitry, etc.) overwrites previously recorded and stored data associated with a subsequent time or event. In addition, or alternatively, the processor 154 removes data that exceeds a predetermined time interval. In addition, the memory device 158 includes, without limitation, sufficient data, algorithms, and commands to facilitate monitoring and measuring of build parameters and geometric conditions of the component 134 fabricated by the additive manufacturing system 100.

In some examples, the computing device 156 (also referred to as a computer, computer device, etc.) includes a presentation interface 160 coupled to the processor 154. The presentation interface 160 presents information, such as images generated by the imaging device 102, to a user. In one example, the presentation interface 160 includes a display adapter (not shown) coupled to a display device (not shown), such as a cathode ray tube (CRT), a liquid crystal display (LCD), an organic LED (OLED) display, an "electronic ink" display, etc. In some examples, the presentation interface 160 includes one or more display devices. In addition, or alternatively, the presentation interface 160 includes an audio output device (not shown), such as an audio adapter or a speaker (not shown).

In some examples, the computing device 156 includes a user input interface 162. In the example of FIG. 1, then user input interface 162 is coupled to the processor 154 and receives input from the user. In some examples, the user input interface 162 includes, for example, a keyboard, a pointing device, a mouse, a stylus, a touch sensitive panel (e.g., a touch pad or a touch screen, etc.), and/or an audio input interface (e.g., a microphone, etc.), etc. In further examples, a single component, such as a touch screen, etc., functions as both a display device of the presentation interface 160 and the user input interface 162.

In the example of FIG. 1, a communication interface 164 is coupled to the processor 154 and is configured to be coupled in communication with one or more other devices, such as the imaging device 102, and to perform input and output operations with respect to such devices while performing as an input channel. For example, the communication interface 164 can include a wired network adapter, a wireless network adapter, a mobile telecommunications adapter, a serial communication adapter, a parallel communication adapter, etc. The communication interface 164 receives a data signal from and/or transmits a data signal to one or more remote devices. For example, the communication interface 164 of the computing device 156 communicates with the controller 130.

The example presentation interface 160 and the communication interface 164 are both capable of providing information suitable for use with the methods described herein, such as, providing information to the user, the processor 154, etc. Accordingly, the presentation interface 160 and the communication interface 164 are referred to as output devices. Similarly, the user input interface 162 and the communication interface 164 are capable of receiving information suitable for use with the methods described herein and are referred to as input devices.

In certain examples, the controller 130 controls the beam 132 from the focused energy source 104 to form a melt pool of the particulate 114. The melt pool of particulate 114 can be formed on the surface of a metallic substrate, for example. In certain examples, a gas stream injects metal powder particulate 114 (e.g., via a nozzle) into the melt pool to produce a deposit on the surface. The particulate 114 can be formed of a single type of metal powder and/or can be a mix of metal and/or other additive powders to form an alloy when heated, for example. Powder introduced to and/or near the melt pool is heated and is absorbed by the melt pool, remains solid and unattached, and/or partially melts and becomes attached to the solidified product, for example.

In an example laser metal deposition process, one or more nozzles blow the powder particulate 114 into the process/build area. The laser beam 132 and the powder particulate 114 interact to preheat the particles 114 to a temperature below their melting point. The preheated particles 114 are absorbed into the laser-induced melt pool. The laser beam 132 and powder nozzles are moved by the controller 130 in the Z direction while the component 134 being constructed/modified is moved in the X-Y plane for a cross-sectional geometry of deposit. Alternatively or in addition, the bed or build area on which the component 134 being constructed/modified is positioned is moved up or down along a Z axis. Multiple layers are built on top of each other to form the 3D component 134. Heat transfer and hydrodynamic flow of the beam-induced melt pool enable formation of the component 134 and/or welding, cladding, surface alloying, etc., of the component 134, for example.

A plurality of process parameters affect the microstructure and mechanical properties of a 3D printed object (e.g., the component 134) using a powder bed fusion and/or other laser-based melting process, including scanning speed (e.g., in millimeters per second (mm/s), etc.), beam speed/speed function, beam current or beam power (e.g., in Watts (W), etc.), layer thickness (e.g., in mm, etc.), and line offset. Such parameters can be adjusted and/or optimized to result in desired 3D printed object properties. For example, beam power, scan speed, spacing, layer thickness, etc., affect an energy density (e.g., average applied energy per volume of material, J/mm3). In some examples, the beam speed can be adjusted near an edge of the object 134 to prevent overheating. Layer thickness (e.g., 50-150 um) affects geometric accuracy of a fabricated object and can be varied depending on the type of 3D printer used, as well as other process parameters such as material powder particle size, etc. Additionally, a scanning pattern and scanning speed also affect the final 3D printed object 134 microstructure and porosity. For example, a scanning pattern (e.g., cross-section of layer) represents the geometric track of the electron beam and/or laser beam 132 used to melt the metal powder to form a cross-section on a powder bed/build area. Such geometries can include outer contours, inner contours, and/or a hatch pattern, for example.

Thus, the imaging device 102 and/or other camera(s) can be mounted and/or otherwise positioned in the vicinity of the build platform on which the component 134 is manufactured via the 3D printing apparatus 100. For example, the camera can be internal to the build chamber. Additionally or alternatively, camera(s) can be mounted about or adjacent to a build chamber (e.g., mounted outside of the build chamber and viewing the melt pool and/or other aspect of the build process through an aperture, door, window, etc.).

Various types of camera(s) can be used. In general, line scan cameras can produce very high resolution images, enabling detection of features that would otherwise go undetected with lower resolution equipment. Many line scan cameras are capable of producing images having resolution of 12 K at 50 um per pixel, though even small pixel width of 5-15 um is possible in some cases. Line scan cameras, however, need to be moved over the area to be imaged. Other types of cameras, such as a Digital Single-lens Reflex (DSLR) type camera, do not need to be moved, can more easily be positioned outside, or can be stationary within the build chamber, and can capture images at an angle with specialized lenses. Image resolution, however, is generally not as robust as that of high-end line scan cameras. Accordingly, the particular imaging equipment used may vary depending on the circumstances and desired flaws to monitor.

The imaging system 102 and/or other camera(s) can capture images in real-time during the build process. The images can then be evaluated, in real time (or substantially real-time given data capture, transmission, processing, and/or storage latency), in one example, using one or more algorithms executed as software on a data processing system. The data processing system can be included as part of the camera/imaging system 102, in one example. In other examples, the data processing system is in wired or wireless communication with a camera responsible for acquiring the images, where the camera communicates the images through one or more wired or wireless communication paths to a data processing system. The data processing system can be the controller 130 and/or computing device 156 system described above, and/or can be a different data processing system dedicated to evaluation of the acquired images, for example.

The camera(s) can intermittently or periodically acquire still frame images of the build process and/or video of the build process. In some examples, the resolution of the camera(s) is set to about 25 micrometers per pixel, corresponding approximately to a 2" field of view, though camera(s) with different resolutions and/or different fields of view can alternatively be used.

Certain examples manage and analyze high-dimensional, high-volume, camera data generated by an additive printing machine, such as the example apparatus 100, during the printing process. Certain examples provide a deep learning based, undercomplete autoencoder to reduce dimensionality of a camera image by multiple orders while retaining an ability to reconstruct images with low error. Certain examples provide analytics to convert captured video into relevant image frames to preserve critical information. In certain examples, captured image(s) of the melt pool are preprocessed using region-growing based image preprocessing to segment the melt pool in the overall image frame. Further, in situ analytics, deployed in a machine on-board system, can process the camera data to produce insights, including process deviations, etc., with respect to the melt pool and a 3D printing process. Certain examples provide a storage mechanism to efficiently deposit a low-dimensional autoencoder representation of a generated image such as on the printing apparatus, on a controller, on an edge device, in the cloud, etc. Certain examples perform analyses on a compressed image representation to generate ex situ insights that can augment information from in situ insights to provide improved overall fidelity.

Presently, the complexity of storing high dimensional camera data is addressed using threshold-based techniques, which can be shown to be extremely lossy and incapable of high-fidelity detection of melt pool non-compliance. To address these and other concerns, certain examples provide improved analysis, processing, and storage of camera data (e.g., as features extracted to form compressed camera data, etc.).

Certain examples provide systems and methods for offline model development to represent expected melt pool characteristics such as an image power signature, etc. Machine learning model(s) can be trained, tested, and deployed to be used with the additive manufacturing apparatus (e.g., the example apparatus 100, etc.) to identify/predict defects, anomalies, etc., when used to process image data acquired for an ongoing additive manufacturing process.

Certain examples provide compression, management, and analysis of downbeam camera data for additive manufacturing. Certain examples develop a machine learning and/or other artificial intelligence (AI) model that is developed (e.g., trained and tested, etc.) offline and then deployed as a model construct to be applied online to image data captured for an ongoing additive manufacturing process.

Figure 2:
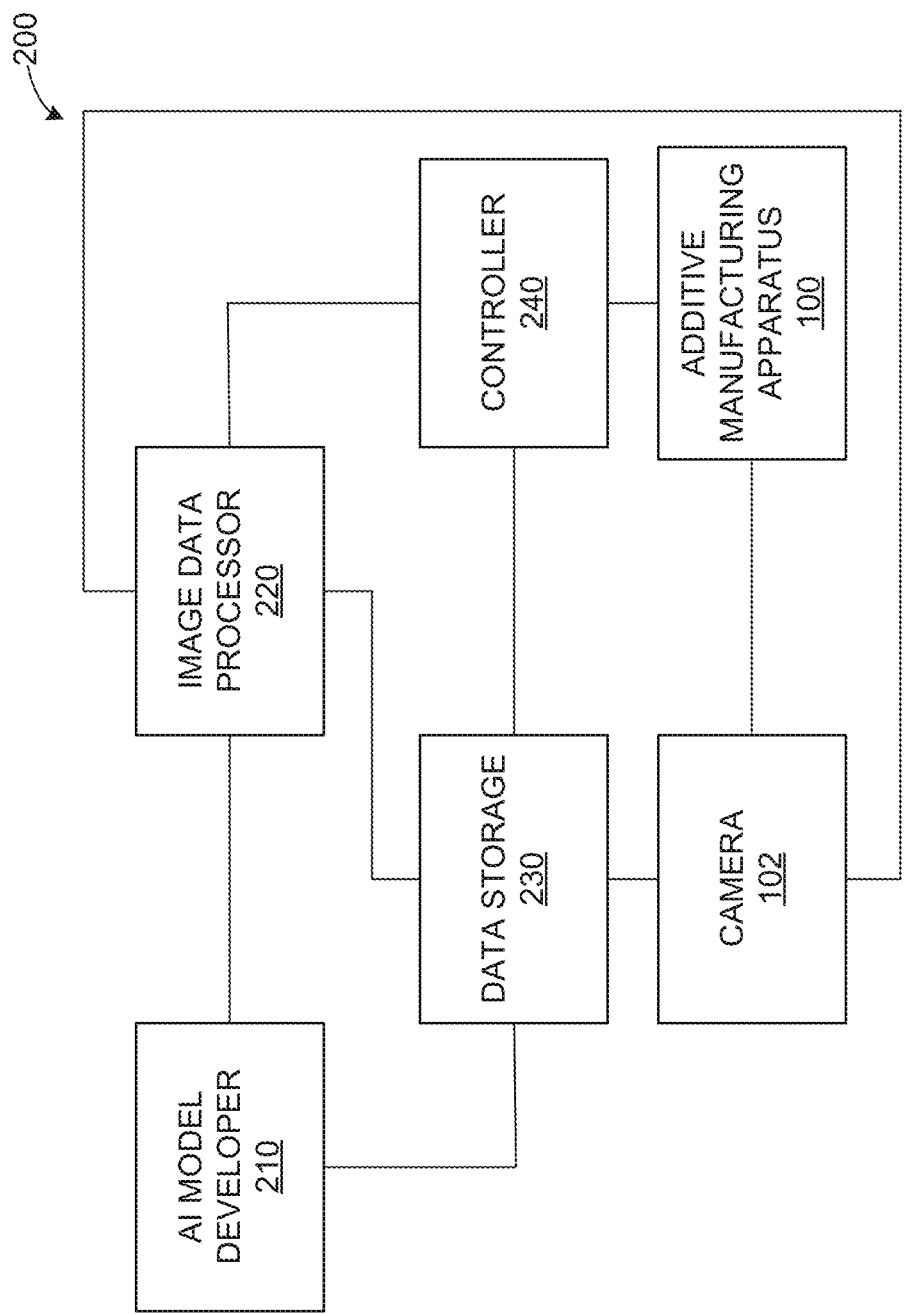
FIG. 2 illustrates an example additive manufacturing monitoring and control system.

FIG. 2 illustrates an example additive manufacturing monitoring and control system 200. The example system 200 includes an AI model developer 210, an image data processor 220, a data storage 230, a controller 240, the camera 102, and the additive manufacturing apparatus 100. In the example of FIG. 2, the AI model developer 210 develops (e.g., trains, tests, and deploys) one or more AI network models (e.g., a machine learning network model such as a convolutional neural network (CNN) (e.g., an Inception V1 network, an Inception V4 network, an Xception network, etc.), a recurrent neural network (RNN) (e.g., a long short-term memory (LS™), etc.), an encoder-based network model (e.g., an autoencoder, etc.), other AI network model, etc.) to be deployed for use by the image data processor 220.

For example, the camera 102 can obtain image data, such as images of a melt pool formed by the additive manufacturing apparatus 100, and the image data can be used by the AI model developer 210 to train and/or test one or more AI models. Alternatively or additionally, preset, reference, and/or other previously obtained images of a melt pool can be used to train the AI model developer 210. Training and/or testing images can be stored in the data store 230, for example. Once the AI model(s) is trained and tested, the AI model(s) can be deployed, such as by storing the AI model(s) in the data storage 230, deploying the AI model(s) to the image data processor 220, etc.

In the example of FIG. 2, the image data processor 220 receives the AI model(s) from the AI modeler developer 210, the data storage 230, etc., and image data from the data storage 230, the camera 102, etc. The image data processor 220 processes the image data (e.g., of a melt pool) using the AI model(s) to characterize and/or otherwise evaluate the melt pool represented in the image data. For example, the AI model(s) can compare a captured melt pool image (e.g., features extracted from the captured melt pool image, other image characteristics, etc.) to reference melt pool image values (e.g., reference, ground truth or "known" image feature values encoded in the AI network model, etc.) to determine whether or not the captured melt pool image corresponds to an expected melt pool image for formation of a component 134 by the additive manufacturing apparatus 100 or is distinct from the expected image, which may indicate that the 3D printing of the component 134 by the apparatus 100 is proceeding incorrectly. An outcome of the image data processor 220 can be provided to the controller 240 (e.g., the controller 130 and/or the computing device 156, etc.) to adjust operation of the additive manufacturing apparatus 100. As such, the additive manufacturing apparatus 100 can react in real time (or substantially real time given data capture, transmission, processing, storage, and/or recalibration latency, etc.) to adjust parameters of the apparatus 100 to correct printing of the component 134 during, rather than after, the 3D printing operation, for example.

Figure 3:
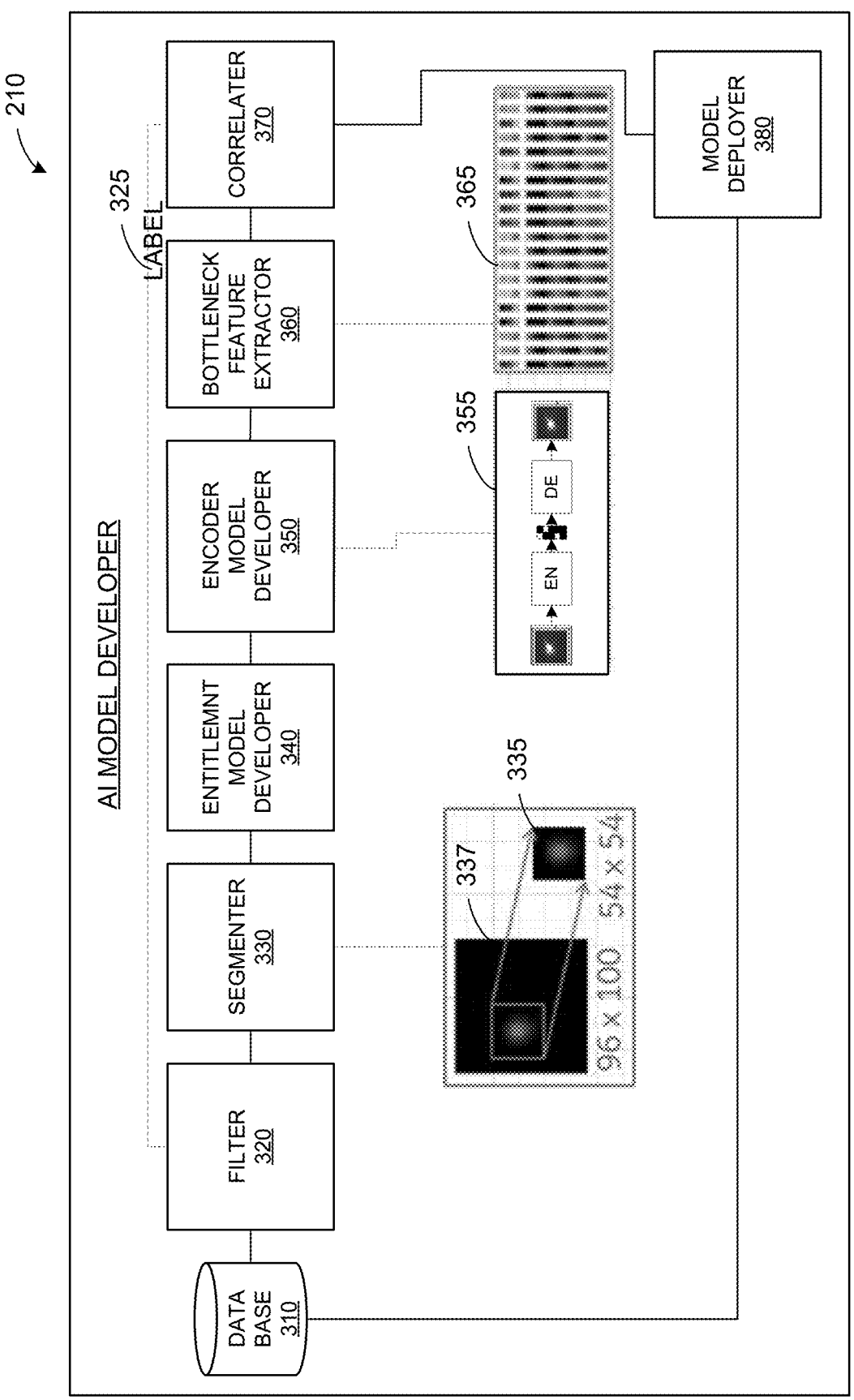
FIG. 3 illustrates an example implementation of the AI model developer of FIG. 2.

FIG. 3 illustrates an example implementation of the AI model developer 210 of FIG. 2. As shown in the example of FIG. 3, the example AI model developer 210 includes a database 310 of downbeam camera (DBC) data (e.g., image data from the data storage 230, camera 102, etc.) to train and/or test one or more AI models. An image filter 320 processes the image data from the database 310 to filter dark frames of the image data, identify label(s) 325 in the image frames/slices, etc. For example, images of example, actual, and/or reference melt pools are filtered to remove dark frames of melt pool image data (e.g., frames that do not include an image of the melt pool and are instead all or mostly "dark") and identify label(s) 325 in the remaining melt pool image data. A segmenter 330 segments a region of interest (ROI) 335 around a lighter portion (e.g., a "bright spot", etc.) representing the melt pool in the filtered, labeled image 337.

The segmented ROI 335 from a plurality of images 337 forms a data set for training, testing, and/or validating one or more AI models. An entitlement model developer 340 divides the data set into a training data set, a validation data set, and a testing data set to develop one or more entitlement AI models, which provide direct analysis of raw downbeam camera frame data to determine a best fit/best guess without restrictions on deployment scenario. For example, the training data set is used to train the AI model. The validation data set is used to evaluate AI model fit on the training data set while tuning hyperparameters of the AI model. The testing data set is used to provide a final evaluation of a final model fit on the training data set. In certain examples, an image data set is divided into training and test datasets according to an 80%-20% split between training data and testing data, respectively. The training, validation, and testing data sets can be used to train one or more AI models, such as one or more classifiers, encoders, etc., to identify and correlate melt pool image features for fingerprinting (FP) and microstructure anomalies/defect detection (AD), for example.

An encoder model developer 350 trains and validates an autoencoder using the training and validation data sets. The encoder model developer 350 explicitly considers deployment scenarios and constraints when determining best fit/best guess for the encoder AI model. For example, the encoder model developer 350 trains, tests, and validates an encoder-based AI model 355 that focuses initially on compressing raw image data and looking at performance achievable in the compressed information space.

A bottleneck feature extractor 360 extracts bottleneck features represented in a final convolutional layer of an AI network model before its fully-connected output layer. The bottleneck feature extractor 360 captures features represented in the bottleneck convolutional layer, and a correlator 370 processes the bottleneck features to evaluate whether the extracted bottleneck features preserve information to correlate to an image feature fingerprint, anomaly/defect detection, etc. The correlator 370 can compare the extracted bottleneck features to label(s) 325 provided by the filter 320 to determine an AI model fit, readiness, etc., for example. In certain examples, the correlator 370 can determine which AI model(s) among a plurality of AI models being developed by the entitlement model developer 340 and the encoder model developer 350 are fit to characterize the melt pool image data for the additive manufacturing apparatus 100 and can be deployed.

A model deployer 370 deploys one or more AI models based on the results of the entitlement model developer 340, the encoder model developer 350, and/or the correlator 370. For example, the model deployer 370 evaluates model fit, available resources, other constraints, etc., to determine whether to deploy one or more AI models to the data storage 230 and/or the image data processor 220 to be used in evaluating additive manufacturing apparatus 100 operation to print the component 134.

In certain examples, the entitlement model developer 340 and/or the encoder model developer 350 can reduce or compress image data for and/or as part of its processing of image data to build the AI model(s). For example, an example melt pool image can include a large number of pixel/intensity values (e.g., 100×100 array of numbers defining or representing the image, etc.). The model developer 340, 350 can evaluate whether or not all image data is to be used to infer and/or otherwise determine whether an image indicates an expected state or stage of the additive manufacturing process or indicates an error, defect, or anomaly in the additive manufacturing process.

In certain examples, not every pixel value need be used to assess a melt pool image. As such, the model developer 340, 350 and/or its associated AI model(s) can form an information space of fewer dimensions than the actual image data to make an assessment, inference, and/or other determination of the appropriateness of a melt pool image and associated setting/parameter.

Figure 4A:
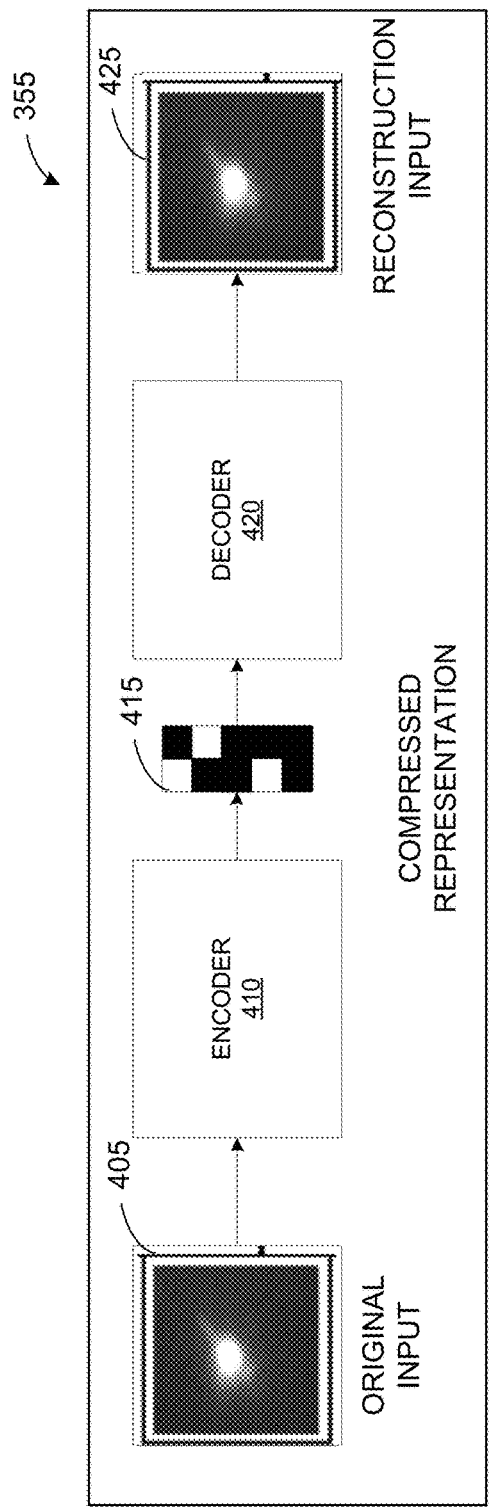
FIG. 4A illustrates an example implementation of the autoencoder of FIG. 3.

For example, the autoencoder 355 can be used to determine a lowest number or set of features that is sufficient to capture and characterize an image to determine a status of the associated additive manufacturing process. FIG. 4A illustrates an example implementation of the autoencoder 355 including an encoder 410 and a decoder 420. As shown in FIG. 4A, an original input image 405 (e.g., a filtered, segmented image 337, etc.) is provided to the encoder 410, which processes the image 405 to generate a reduced or compressed representation 415 of the image data 405. For example, the encoder 410 distills a 100×100 image pixel array into a vector of sixteen numbers that can be used to infer high-power-high-focus, low-power-low-focus, etc. To verify, the decoder 420 processes the compressed representation 415 to generate a reconstructed image 425. The reconstructed image 425 can be compared to the original input image 405 to verify that the encoder 410 properly functioned to reduce the input image 405 to its compressed or feature representation 415 with sufficient information to enable the decoder 420 to reconstruct the same input as the output 425. The encoder 410 and decoder 420 of the autoencoder 355 can be trained, tested, and validated by the encoder model developer 350 based on image data from the data base 310, for example.

In training, the autoencoder 355 can be provided with one or more parameters and tasked with reconstructing an image 405 with low reconstruction error (e.g., under an error threshold, within a standard deviation, satisfying other error tolerance, etc.). When training and testing and/or validation indicate that the encoder 410 and decoder 420 can reconstruct the image 405 within the margin of error using the compressed representation 415, the autoencoder model 355 can be deployed for use, for example. The compressed representation 415 can include a feature vector and/or other latent space that captures minimum or less than full image information or features and can be used for accurate reconstruction of the image input 405, inference of an issue, etc.

If the autoencoder 355 is developed properly (e.g., can reproduce the original image from the compressed set of image features), then only the compressed feature representation 365, 415 can be stored in the data storage 230, provided to the image data processor 220, etc. The encoder 410 can process input image data 405 to identify and reduce the image to a lower or minimal set of features 365, 415 that represent characteristics of the image 405 relevant to examination by the image data processor 220 to evaluate the image 405, 425 (e.g., a vector of 16 numbers corresponding to features representing a 100×100 pixel image slice, etc.). The full image 425 can be reconstructed from the feature vector 415 so that only the reduced form 415 need be stored while still retaining access to full images 425 for processing.

In certain examples, one or more developed AI models are part or component 134 specific (e.g., the model is trained on images of a melt pool of a particular component 134 such as a blade, a vane, a tube, a valve, a gear, etc.). In other examples, one or more developed AI models can be trained and tested/validated to be more general. For example, one AI model can be used to analyze melt pool images regardless of type of material, geometric variation, etc. If warranted/applicable, transfer learning can be used to customize the model for a particular part or variant, for example.

In certain examples, data gathering during an additive manufacturing process, data gathered during model development, feedback obtained from a system using the manufactured component 134, etc., can be stored in the data store 230. Such data can be provided back to the AI model developer 210 to train, test, validate, and/or deploy one or more updated AI models reflecting improved accuracy, increased precision, applicability to different parts, applicability to different materials, etc.

For example, image data capturing spatial interaction between pixels in different layers of a 3D printed part 134 can be used to better develop models, tweak apparatus 100 settings, and/or provide other feedback to the system 200. Rather than a single value, for example, sixteen values can be stored for each layer, and those values can be stored compactly and used for feedback to adapt/adjust models, change parameters, make other apparatus 100 configuration and/or operation corrections, etc.

Figure 4B:
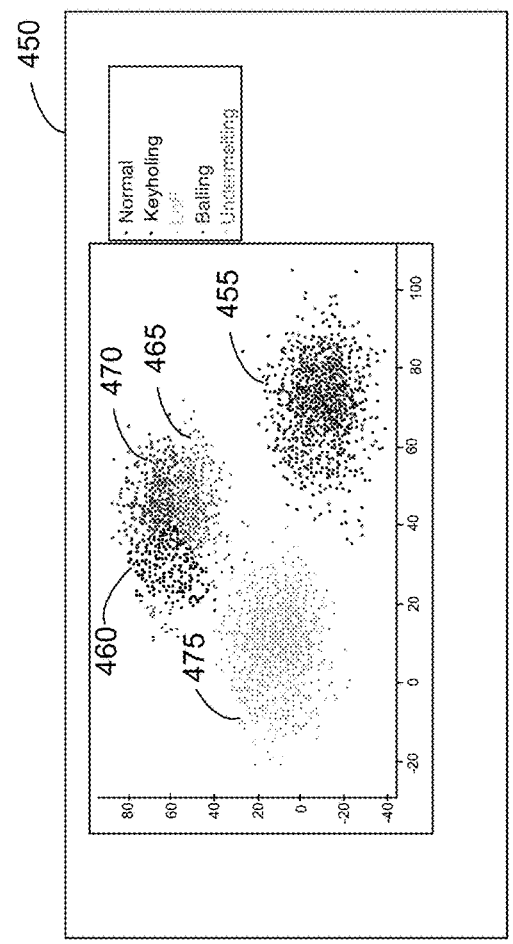
FIG. 4B shows an example graph correlating fingerprinting and melt pool anomaly detection for the additive manufacturing system of FIGS. 1-2.

In certain examples, the bottleneck feature extractor 360 extracts the image features 365, 415 generated by the autoencoder 355 and determines whether sufficient information has been preserved by the features 365, 415 to correlate image characteristics to an image fingerprint and anomaly detection (e.g., to identify an anomaly or error in a 3D printing process, etc.). FIG. 4B shows an example graph 450 correlating fingerprinting and melt pool anomaly detection for the additive manufacturing system 100. As shown in the example of FIG. 4B, features 365, 415 identified by the autoencoder 355 correspond to image features indicative of melt pool properties (e.g., allow another model to infer an issue based on the mapping between image feature and melt pool property, etc.).

For example, an image feature can correspond to a "normal" or expected melt pool property 455. The image feature can indicate keyholing 460 in the melt pool. The keyhole is a deep volume directly under the laser beam 132, and keyholing indicates that the melt pool has a depth to width ratio greater than 0.5. The image feature can indicate undermelting 465 in the melt pool (e.g., the melt pool has a depth less than a nominal layer thickness that can lead to a lack of fusion (LoF) porosity and compromise integrity of the part 134). The image feature can indicate balling 470 in the melt pool (e.g., at high values of power and speed, the melted material solidifies as a series of droplets rather than a continuous layer, which can render the part 134 unusable). The image feature can correspond to LoF 475 in the melt pool (e.g., no complete adherence of a current melt to a surrounding part that can impact final mechanical properties of the part 134 being formed), for example. As such, the image feature(s) can correlate to one or more image fingerprints used for anomaly detection in the melt pool being imaged.

FIG. 5A illustrates an example conversion of images 510 to image features 520, such as using the autoencoder 355 and the bottleneck feature extractor 360. As shown in the example of FIG. 5A, each image 510 can be reduced by the autoencoder 355 to a set of features 520. To test and/or validate the autoencoder 355, the entitlement model developer 340 can compare an actual reconstructed image 530, 540 to a predicted image reconstruction 550, 560, such as shown in the example of FIG. 5B.

Figure 6A:
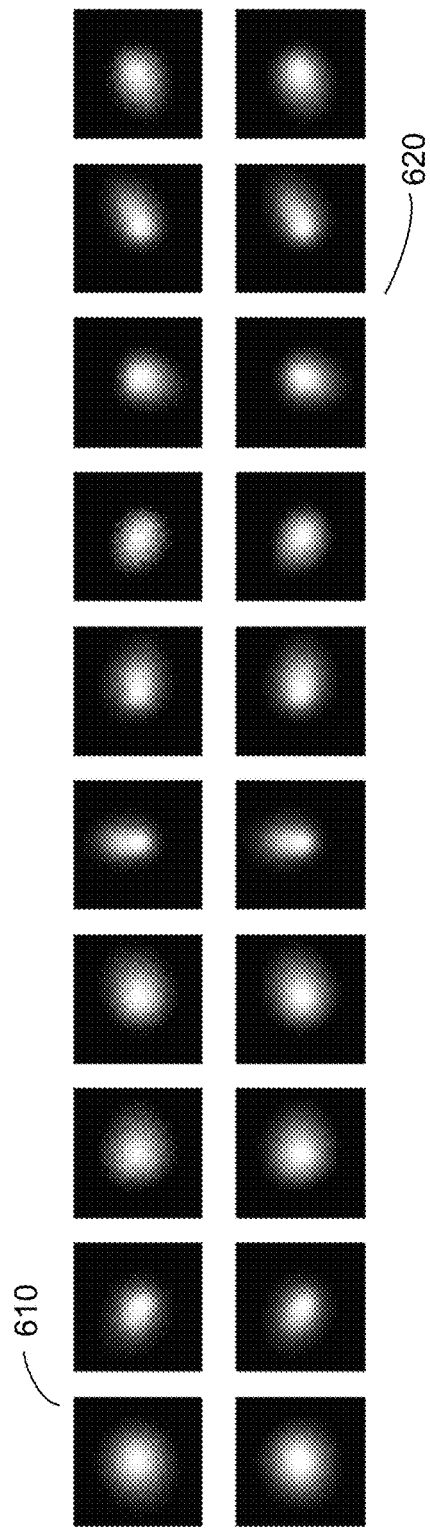
FIG. 6A is an example comparison of actual and predicted image feature vectors.
Figure 6B:
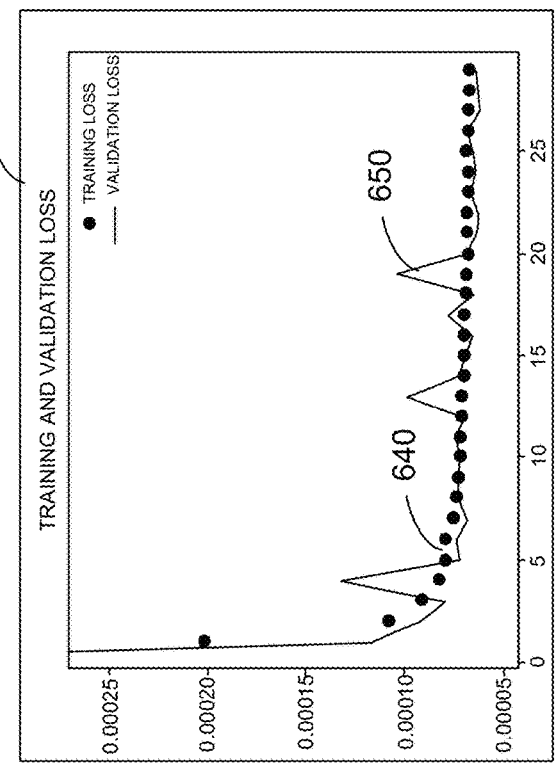
FIG. 6B shows an example mean squared error comparison of training and validation loss using the example autoencoder of FIG. 3.

As shown in the example of FIG. 6A, a comparison of actual 610 to predicted 620 image reconstruction by the autoencoder 355 can be evaluated to determine a mean squared error across epochs. FIG. 6B illustrates a graph 630 of training and validation loss using the autoencoder 355. As shown in the example of FIG. 6B, a training loss 640 and a validation loss 650 result in a mean validation mean squared error (MSE) across epochs of 6.3917e-05.

Figure 7:
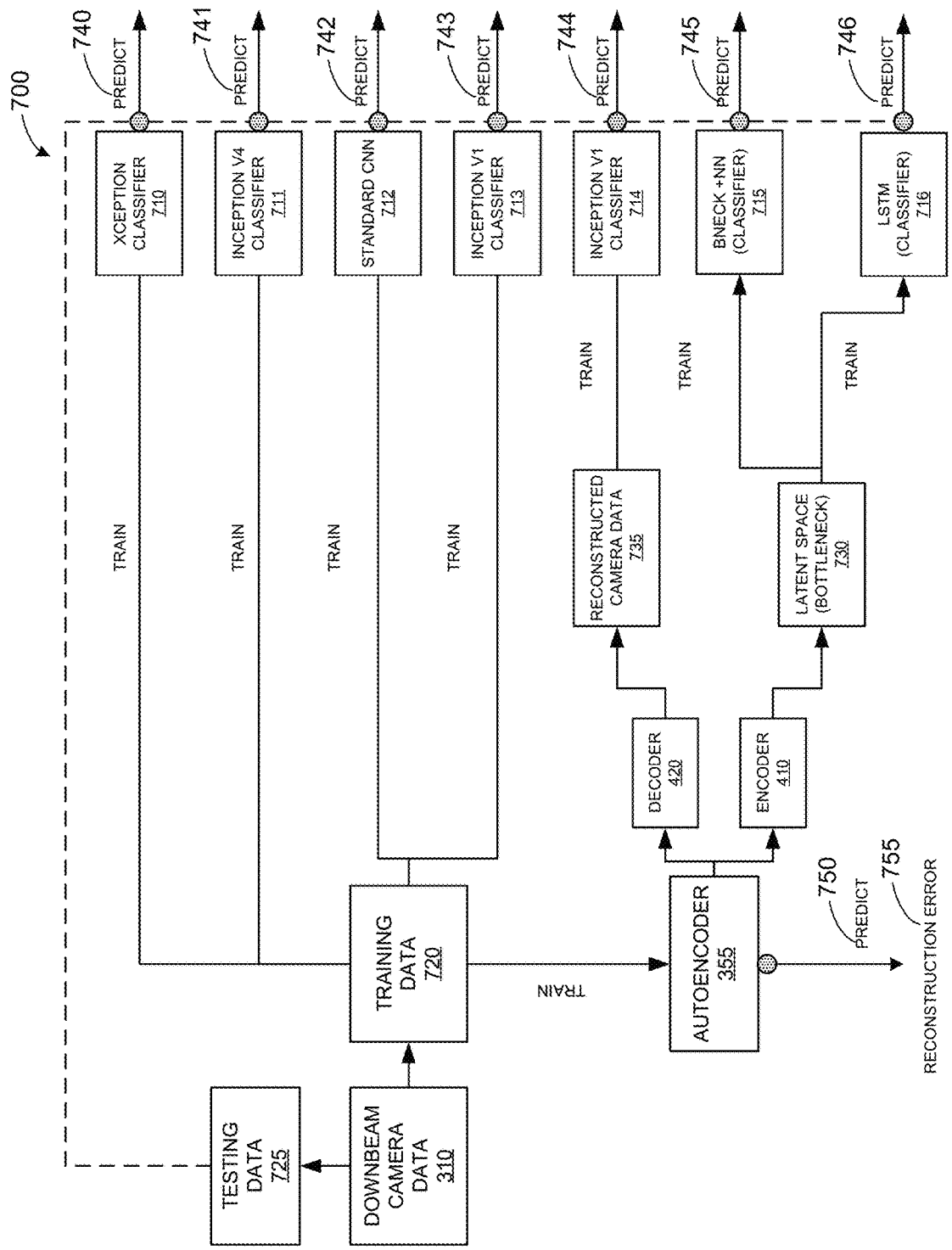
FIG. 7 illustrates an example analysis framework implemented by the entitlement model developer and the encoder model developer of FIG. 3 to train the autoencoder and other AI models.

FIG. 7 illustrates an example analysis framework 700 implemented by the entitlement model developer 340 and the encoder model developer 350 to train the autoencoder 355 and other AI models 710-716. As shown in the example of FIG. 7, the downbeam camera data 310 is divided into training data 720 and testing data 725 (e.g., 80% training data 720 and 20% testing data 725, 70% training data 720 and 30% testing data 725, etc.). The training data 720 is used to train a plurality of AI models 355, 710-716 including the autoencoder 355, an Xception classifier 710, an Inception V4 classifier 711, a standard CNN 712, an Inception V1 classifier 713, an Inception V1 classifier 714, a bottleneck plus neural network classifier 715, an LS™ classifier 716, etc. The AI models 355, 710-716 generate predictions 740-746, 750 by processing the input training data. The testing data 725 can also be used to verify the predictive output 740-746 of the AI models 710-716.

In the analysis framework 700, the predictions 740-746 of the classifiers 710-716 can be evaluated for accuracy based on melt pool fingerprint (e.g., power, focus, etc.), melt pool defect detection, etc. Using the determination of accuracy, a classifier 710-716 can be selected for a particular analysis. For example, one classifier 710-716 can be selected for fingerprinting of image data and another classifier 710-716 can be selected for melt pool defect detection using the image fingerprint. In another example, a single classifier 710-716 can be selected for both fingerprinting and defect detection.

In certain examples, the autoencoder 355 is used to generate a prediction 750 of image reconstruction error 755. The encoder 410 and decoder 420 can also be used to generate training data for classifiers 714-716. For example, the encoder 410 generates latent space information 730 (e.g., bottleneck features 365, etc.) which can be used as training data for the bottleneck+neural network classifier 715 and the LS™ classifier 716. The decoder 420 generates reconstructed camera data 735 to train the Inception V1 classifier 714. As such, the autoencoder 355 can be used to generate a prediction 750 of image reconstruction error 755 and can be used to generate training data 730, 735 to train classifiers 714-716 to predict accuracy of power fingerprint, focus fingerprint, defect detection, etc.

In certain examples, the AI models 355, 710-716 can be compared to select one or more to evaluate melt pool image data to infer a problem (or lack thereof) with the melt pool and associated additive manufacturing process. In one or more deep learning models 710-716, initial layers of the network model 710-716 (not shown) can be dedicated to learning about the input image (e.g., edges, relationship between objects, etc.), and a final set (e.g., one, two, three, etc.) of inference layers of the network model combine the learning results to form an output (e.g., represent a set of features, a subsection of an image, etc.). Thus, the network models 710-716 can be compared to evaluate an amount of information in the input images and compare model performance to select one or more models 710-716 to be deployed to process image data.

For example, in training, the Inception v1 classifier 713 provides 90% accuracy to predict focus and 85% accuracy to predict power. However, the Inception v1 network 713 can include 10,000,000-100,000,000 parameters, rendering the model 713 too large to deploy on a network edge device, a field programmable gate array (FPGA), etc. A simpler network, such as the autoencoder 355, can operate on less data than the raw image data (e.g., reducing a 100×100 array of image pixels to a 16-feature vector, etc.) while providing sufficient accuracy to interpret a melt pool image and identify/infer any defect, anomaly, deviation, etc., in the melt pool indicating a problem with an additive manufacturing process in situ.

Thus, certain examples manage and analyze high-dimensional, high-volume, camera data generated by an additive printing machine 100 during a printing process. Camera data includes an in situ video and/or photo capture of the 3D printing process and enables capture of in situ melt pool characteristics. Analysis of melt pool characteristics reveals insights about compliance of the 3D print or build process with a specification (e.g., a CAD file, part model, etc.), including deviation from desired build characteristic(s)/specification. Upon discovering a deviation, the 3D printing process can be brought back into compliance in situ by adjusting one or more process parameters of the apparatus 100 using the controller 130 to reduce, eliminate, and/or otherwise compensate for the deviation. The adjustment helps to ensure a real time check on the quality of the part 134 being built and helps to correct situations that can lead to formation of defective characteristics in the part 134. In situ quality control introduces multiple challenges to be overcome: i) complexity due to size as well as rate at which the data grows, ii) challenge of managing storage of such data over time, iii) in situ analysis of such data in a time-efficient manner to enable in situ compensation, iv) an ability to deploy such analysis into a limited ecosystem of compute and memory resources available to the controller 130, v) an ability to index such data to tie the data to the accurate spatio-temporal co-ordinates, and vi) an ability to accommodate variability induced from multiple environmental and process-independent factors when performing such analyses, for example. Certain examples address and solve such challenges.

While example implementations are illustrated in conjunction with FIGS. 1-7, elements, processes and/or devices illustrated in conjunction with FIGS. 1-7 can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc., storing the software (including computer- and/or other machine-readable instructions) and/or firmware. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
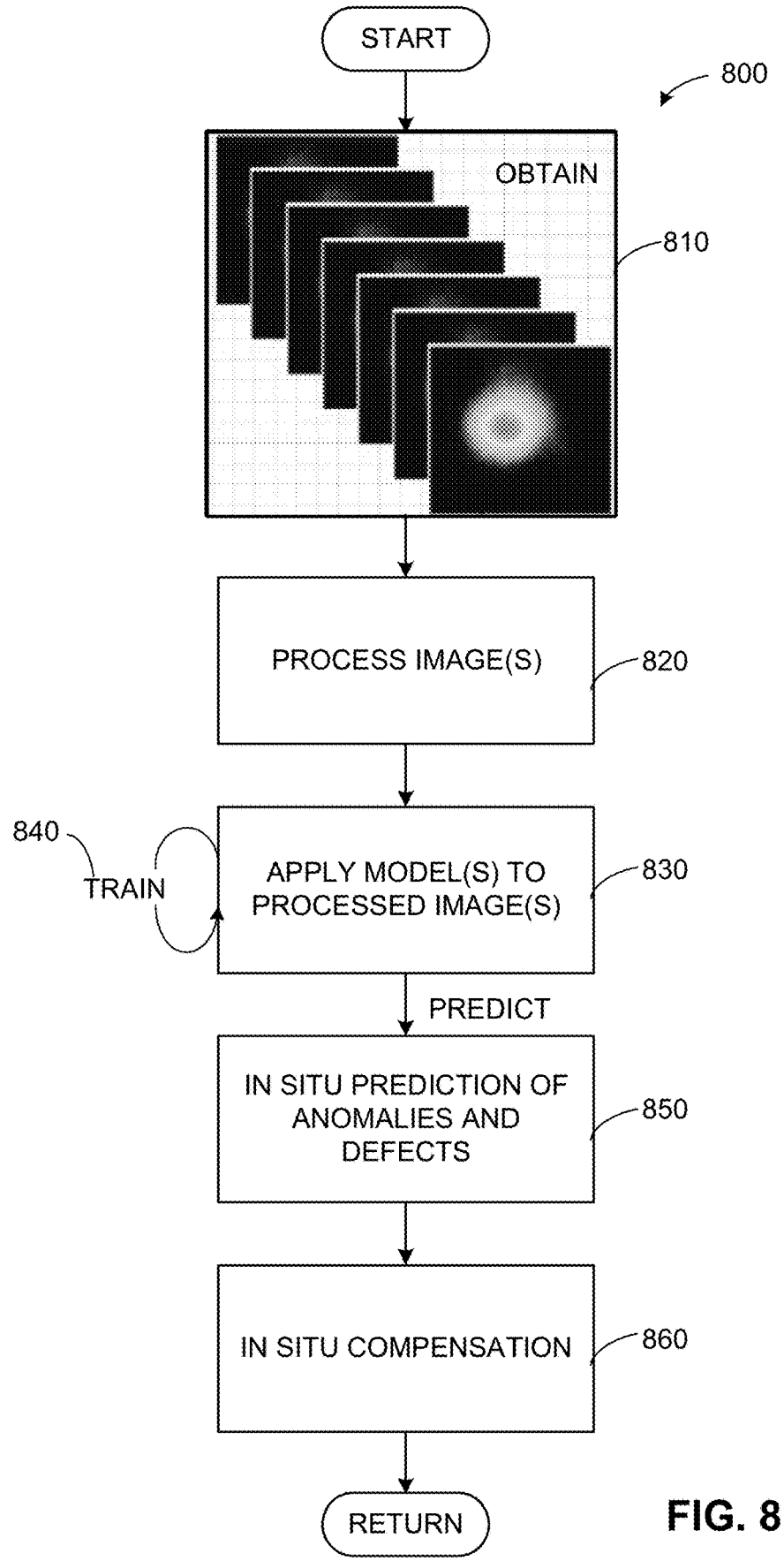
FIGS. 8-9 illustrate flowcharts representative of example machine readable instructions that can be executed to configure and control the example additive manufacturing apparatus of FIGS. 1-4A.
Figure 9:
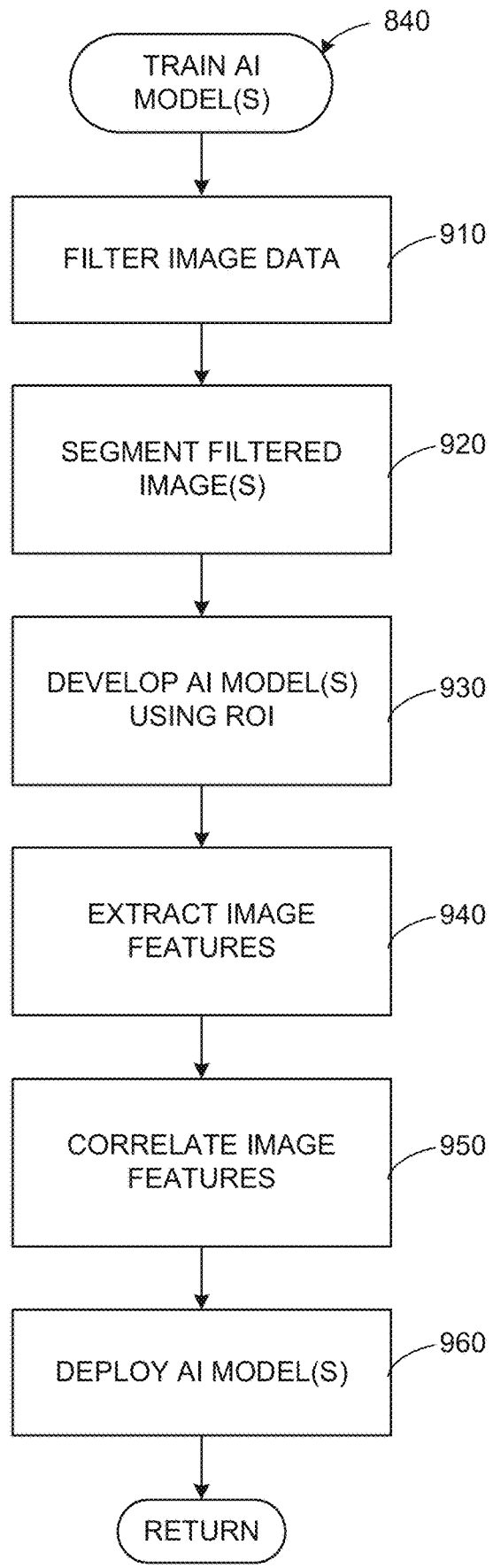

Flowcharts representative of example hardware logic, machine readable instructions, hardware implemented state machines, and/or any combination thereof for implementing the monitoring and control system for additive manufacturing 200 of FIGS. 1-4A are shown in FIGS. 8-9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8-9, many other methods of implementing the example monitoring and control system for additive manufacturing 200 can alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 8-9 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

FIG. 8 illustrates a flowchart 800 representative of example machine readable instructions that can be executed to configure and control the example additive manufacturing apparatus 100. At block 810, one or more images (e.g., still camera image(s), a video stream, snapshot(s) from video, etc.) are obtained of the melt pool formed during 3D printing by the additive manufacturing apparatus 100. For example, the camera 102 can be used to obtain one or more still images, video, etc., of an ongoing additive manufacturing process to form the component 134 using the apparatus 100.

At block 820, the one or more images are processed by the controller 130, the computing device 156, the AI model developer 210, and/or the image data processor 220. For example, features are extracted from each image, and the set of features is reduced to a set of bottleneck features representing a minimum or other reduced set of image features from which an AI model is able to reconstruct the original source image. For example, an image represented by a 100×100 pixel array can be reduced to a set or vector of 16 image features. This reduction can be performed using an AI model, such as the autoencoder 355, an image filter, etc. In certain examples, the original image can be segmented to identify a region of interest 335 including the melt pool image data. That region of interest 335 can then be processed for feature extraction and dimensionality reduction to a reduced or minimum viable feature set (e.g., a "compressed" feature vector).

At block 830, one or more AI models are applied to the processed image(s) (e.g., by the image data processor 220 and/or the controller 240) to analyze the processed images (e.g., their feature set and/or other reduced representation, etc.) for anomalies and defects. For example, an inception model, an exception model, a CNN model, an LS™ model, a combination feature/NN model, etc., can be applied to the processed image data to identify image patterns (e.g., fingerprint(s)) indicative of an anomaly, defect, etc., in the additive manufacturing process.

For example, the camera 102 records data as the laser moves along a prescribed path and forms a melt pool from which to manufacture the part 134. Pixels in the image data, etc., provide an indication of thermal properties of the melt pool, etc., that are processed by the model(s) to infer or classify a state or condition of the additive manufacturing process. The camera 102 is attached along a same axis as the laser 104, aimed down into the melt pool, and collects video and/or still image data at a same rate that the laser 104 is burning the part 134. As such, image data is collected at a high frequency (e.g., 5 kilohertz (kH), 10 kHz, 20 kHz, etc.) in a large volume. Compression (e.g., reduction of the image data to feature vectors, etc.) allows the large volume of image data to be more easily and effectively stored, compared, and processed, for example. The AI model(s) can be trained based on an expected melt pool image appearance for a particular laser power/intensity (e.g., 350 Watt (W) downbeam data, 370 W downbeam data, 400 W downbeam data, etc.). A deviation of the actual image data from the expected image data is identified by the model(s) and used to infer a defect, anomaly, and/or other error in the manufacture of the part 134, for example.

At block 840, the AI model(s) are trained to be applied to the image data to identify anomalies, defects, etc. One or more AI models can be trained by processing a plurality of training, testing, and/or validation images, such as described above with respect to FIGS. 3-7. The AI model(s) are developed by the AI model developer 210 to be deployed and applied to the image data by the image data processor 220. The AI model(s) can be developed and deployed by the AI model developer 210 offline and/or otherwise in parallel with model use in the process 800.

At block 850, one or more anomalies, defects, etc., are predicted in the additive manufacturing apparatus 100 and/or an ongoing additive manufacturing progress using output from the AI model(s). For example, an output of one or more AI models is processed to determine whether an anomaly, defect, and/or other error is occurring in the ongoing 3D printing process. That is, the predictive output 740-746, 750 from a single AI model 710-716, 355 can be used and/or multiple outputs 740-746, 750 can be combined to identify an error in the 3D printing process. For example, one or more errors such as keyholing, LoF, balling, undermelting, etc., can be inferred by the model(s) 710-716, 355 by analyzing the associated melt pool image(s). An image data intensity value corresponding to a melt pool area temperature, density, etc., can be analyzed to infer and/or otherwise indicate whether the image data value corresponds to an expected or "normal" value (e.g., compared to a reference value for the process, part, etc.).

At block 860, the additive manufacturing apparatus 100 is adjusted to compensate for the identified/inferred defect, anomaly, and/or other error. For example, as the 3D printing process continues, the controller 240 adjusts one or more parameters of the laser 104 (e.g., power, scan speed, location, focus, spot size, etc.) to correct for the one or more defect, anomaly, and/or other error identified in the melt pool image(s).

FIG. 9 illustrates a flowchart 900 representative of example machine readable instructions that can be executed to train the one or more AI models to process image data to infer associated melt pool characteristics (e.g., block 840 of the example of FIG. 8). At block 910, image data (e.g., data representing pixel and/or voxel values of one or more images, video, etc.) is filtered. For example, the image filter 320 processes image data to remove dark frames of image data (e.g., images that do not include the melt pool, other images that are black or mostly "dark", etc.), identify label(s) 325 in images frames/slices, etc.

At block 920, the filtered image data is segmented to separate or isolate a region of interest (ROI) 335 including the melt pool image data from the rest of the image 337. For example, the remaining image(s) are processed by the segmenter 330, which identifies a lighter portion or "bright spot" in the image representing the melt pool.

At block 930, one or more AI models are developed using the region of interest 335. For example, the region of interest 335 is provided to one or more model developers such as the entitlement model developer 340, the encoder model developer 350, etc. For example, the processed image data is divided into training data and test and/or validation data and provided to the entitlement model developer 340 and/or the encoder model developer 350 to train and test and/or validate one or more AI models such as the autoencoder 355, CNN, Inception classifier, Xception classifier, LS™ classifier, combination neural network model, etc.

At block 940, image features are extracted from the region of interest 335 image data. For example, the image data from the region of interest 335 image(s) is processed by one or more AI models to compress/reduce the image to a set of representative, key, or "bottleneck" features 365 (e.g., from an array of 100×100 pixels to a vector of 16 features, etc.).

At block 950, the image features are correlated to melt pool conditions. For example, the feature vector 365 is processed by one or more AI models to compare the feature vector to known/reference/ground truth melt pool states (e.g., a normal melt pool state, an abnormal melt pool state indicating a problem with the additive manufacturing process, etc.). As such, the model(s) can match the actual image data (e.g., as represented by the feature vector, etc.) to a melt pool status or condition for which the model has been trained. For example, one or more AI models can be trained to recognize a defect or anomaly in an additive manufacturing process to produce a part 134 based on characteristics of the melt pool reflected in captured image data. For example, melt pool characteristics represented by pixel values and/or associated features 365 include normal, keyholing, LoF, balling, etc. An AI model is considered ready for deployment when the model can identify the target characteristic in the melt pool image/feature vector that is provided to the model, for example.

At block 960, one or more AI models are deployed. For example, one or more AI models are deployed by the model deployer 380 to be used to process input image data for melt pool anomalies, defects, etc. One or more models can be deployed based on the part 134 being printed, the type of laser 104, reliability and/or relevance of the model determined by the correlator 370 and/or the model deployer 380, configuration of the system 200 (e.g., on device 100, on an edge device, in the cloud, and/or other system resource constraint, etc.), reconstruction error output 755, etc. The deployed model(s) can be used to execute the process 800, for example.

Figure 10:
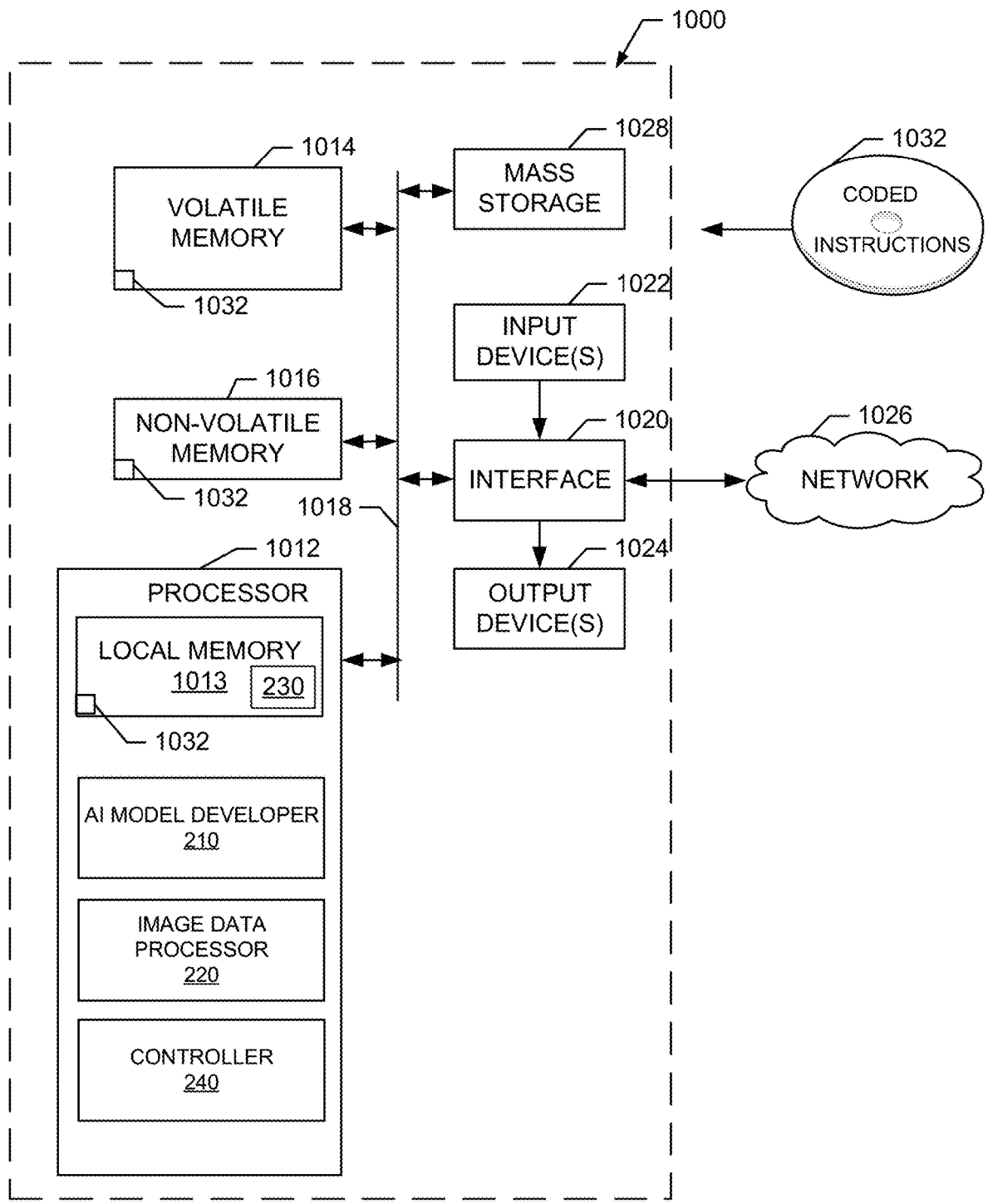
FIG. 10 is a block diagram of an example processor platform structured to executing instructions to implement the example elements disclosed and described herein.

FIG. 10 is a block diagram of an example processor platform 1000 structured to executing instructions to implement the example elements disclosed and described herein. The processor platform 1000 can be, for example, a server, a personal computer, a mobile device (e.g., a cell phone, a smart phone, a tablet such as an iPad™), a personal digital assistant (PDA), an Internet appliance, or any other type of computing device. The example processor platform 1000 can be used to implement the example additive manufacturing control system 200 and/or one or more of its component AI model developer 210, image data processor 220, data storage 230, controller 240, additive manufacturing apparatus 100, and/or camera 102, for example.

The processor platform 1000 of the illustrated example includes a processor 1012. The processor 1012 of the illustrated example is hardware. For example, the processor 1012 can be implemented by integrated circuits, logic circuits, microprocessors or controllers from any desired family or manufacturer.

The processor 1012 of the illustrated example includes a local memory 1013 (e.g., a cache). The example processor 1012 of FIG. 10 executes instructions from the memory 1013, etc. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a clock controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 representing instructions executable by the processor 1012 can be stored in the mass storage device 1028, in the volatile memory 1014, in the non-volatile memory 1016, and/or on a removable tangible computer readable storage medium such as a CD or DVD, for example.

From the foregoing, it will be appreciated that the above disclosed methods, apparatus, and articles of manufacture have been disclosed to provide a new, improved monitoring and control system for additive manufacturing. The disclosed methods, apparatus and articles of manufacture provide dynamic, reliable adjustment of an ongoing additive manufacturing process by an additive manufacturing apparatus to improve product yield, reduce waste, and strengthen product reliability through real-time monitoring, processing, and adjustment of an additive manufacturing process for the product. The disclosed methods, apparatus and articles of manufacture are accordingly directed to one or more improvement(s) in the functioning of an additive manufacturing apparatus. Further, the capabilities of the additive manufacturing system are expanded to capture in-process image data, analyze the image data to understand system behavior and process status, and adjust itself to reduce or avoid a defect, anomaly, or other error in manufacturing.

Further aspects of the invention are provided by the subject matter of the following clauses. Example 1 includes an apparatus comprising: memory to store instructions; and at least one processor to execute the instructions to at least: extract image features from image data to represent the image data as a set of image features, the image data captured by a camera during an additive manufacturing process and including an image of a melt pool of the additive manufacturing process; apply an artificial intelligence model to the set of image features; predict an error in the additive manufacturing process using an output of the artificial intelligence model; and compensate for the error by adjusting a configuration of the apparatus during the additive manufacturing process.

Example 2 includes the apparatus of any preceding clause, wherein the at least one processor is to filter the image data before extracting the image features.

Example 3 includes the apparatus of any preceding clause, wherein the at least one processor is to segment the image data to isolate a region of interest including the image of the melt pool before extracting the image features and applying the artificial intelligence model to the set of image features.

Example 4 includes the apparatus of any preceding clause, wherein the artificial intelligence model includes at least one of an entitlement model or an encoder model.

Example 5 includes the apparatus of any preceding clause, wherein the artificial intelligence model includes an autoencoder.

Example 6 includes the apparatus of any preceding clause, wherein the autoencoder is to reduce the image data to the set of features forming a feature vector and to reconstruct the image data from the feature vector.

Example 7 includes the apparatus of any preceding clause, wherein the artificial intelligence model is trained using stored image data to develop the artificial intelligence model, correlate the artificial intelligence model with the error, and deploy the artificial intelligence model to process captured image data.

Example 8 includes the apparatus of any preceding clause, wherein the at least one processor is to compensate for the error by adjusting at least one of power, scan speed, focus, or spot size of the apparatus during the additive manufacturing process.

Example 9 includes a method comprising: extracting, by executing an instruction using at least one processor, image features from image data to represent the image data as a set of image features, the image data captured by a camera during an additive manufacturing process and including an image of a melt pool of the additive manufacturing process; applying, by executing an instruction using at least one processor, an artificial intelligence model to the set of image features; predicting, by executing an instruction using the at least one processor, an error in the additive manufacturing process using an output of the artificial intelligence model; and compensating for the error by adjusting, by executing an instruction using the at least one processor, a configuration of the additive manufacturing process.

Example 10 includes the method of any preceding clause, further including filtering the image data before applying the artificial intelligence model.

Example 11 includes the method of any preceding clause, further including segmenting the image data to isolate a region of interest including melt pool image data before applying the artificial intelligence model to the region of interest.

Example 12 includes the method of any preceding clause, further including training at least one of an entitlement model or an encoder model to form the artificial intelligence model.

Example 13 includes the method of any preceding clause, further including: training the artificial intelligence model using stored image data to develop the artificial intelligence model; correlating the artificial intelligence model with the error; and deploying the artificial intelligence model to process captured image data.

Example 14 includes the method of any preceding clause, wherein compensating for the error includes adjusting at least one of power, scan speed, focus, or spot size of an energy beam used during the additive manufacturing process.

Example 15 includes an additive manufacturing apparatus comprising: an energy source to melt material to form a component in an additive manufacturing process; a camera aligned with the energy source to obtain image data of the melted material during the additive manufacturing process; and a controller to control the energy source during the additive manufacturing process in response to processing of the image data, the controller to adjust control of the energy source based on a correction determined by: extracting image features from image data to represent the image data as a set of image features, the image data captured by the camera during the additive manufacturing process and including an image of a melt pool formed from the melted material in the additive manufacturing process; applying an artificial intelligence model to the set of image features; predicting an error in the additive manufacturing process using an output of the artificial intelligence model; and compensating for the error by generating a correction to adjust a configuration of the energy source during the additive manufacturing process.

Example 16 includes the apparatus of any preceding clause, wherein the controller is to filter and segment the image data to isolate a region of interest including the image of the melt pool before extracting the image features and applying the artificial intelligence model to the set of image features.

Example 17 includes the apparatus of any preceding clause, wherein the artificial intelligence model includes an autoencoder.

Example 18 includes the apparatus of any preceding clause, wherein the autoencoder is to reduce the image data to a feature vector and to reconstruct the image data from the feature vector.

Example 19 includes the apparatus of any preceding clause, wherein the artificial intelligence model is trained using stored image data to develop the artificial intelligence model, correlate the artificial intelligence model with the error, and deploy the artificial intelligence model to process captured image data.

Example 20 includes the apparatus of any preceding clause, wherein the controller is to compensate for the error by adjusting at least one of power, scan speed, focus, or spot size of the energy source during the additive manufacturing process.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory to store instructions; and
   at least one processor to execute the instructions to at least:
   compress raw image data using at least one of a feature vector or a latent space that captures less than full image information, the raw image data captured by a camera during a build of a part in an additive manufacturing process and including an image of a melt pool of the additive manufacturing process during the build;
   extract image features from the compressed raw image data to represent the raw image data as a set of image features;
   analyze the set of image features to generate an ex situ insight;
   apply an artificial intelligence model to the set of image features;
   predict an error in the additive manufacturing process using an output of the artificial intelligence model;
   identify an in situ insight related to adjusting the configuration of the apparatus including modifying an energy density of the additive manufacturing process during the build; and
   compensate for the error by adjusting a configuration of the apparatus for at least one of a current layer or a subsequent layer based on the in situ insight augmented with the ex situ insight.

2. The apparatus of claim 1, wherein the at least one processor is to filter the image data before extracting the image features.

3. The apparatus of claim 1, wherein the at least one processor is to segment the image data to isolate a region of interest including the image of the melt pool before extracting the image features and applying the artificial intelligence model to the set of image features.

4. The apparatus of claim 1, wherein the artificial intelligence model includes at least one of an entitlement model or an encoder model.

5. The apparatus of claim 4, wherein the artificial intelligence model includes an autoencoder.

6. The apparatus of claim 5, wherein the autoencoder is to reduce the image data to the set of features forming a feature vector and to reconstruct the image data from the feature vector.

7. The apparatus of claim 1, wherein the artificial intelligence model is trained using stored image data to develop the artificial intelligence model, correlate the artificial intelligence model with the error, and deploy the artificial intelligence model to process captured image data.

8. The apparatus of claim 1, wherein the at least one processor is to compensate for the error by modifying the energy density by adjusting at least one of power, scan speed, focus, or spot size of the apparatus during the additive manufacturing process.

9. A method comprising:
compressing, by executing an instruction using at least one processor, raw image data using at least one of a feature vector or a latent space that captures less than full image information, the raw image data captured by a camera during a build of a part in an additive manufacturing process and including an image of a melt pool of the additive manufacturing process during the build;
extracting, by executing an instruction using at least one processor, image features from the compressed raw image data to represent the raw image data as a set of image features;
analyzing the set of image features to generate an ex situ insight;
applying, by executing an instruction using at least one processor, an artificial intelligence model to the set of image features;
predicting, by executing an instruction using the at least one processor, an error in the additive manufacturing process using an output of the artificial intelligence model;
identify an in situ insight related to adjusting the configuration of the apparatus including modifying an energy density of the additive manufacturing process during the build; and
compensating for the error by adjusting, by executing an instruction using the at least one processor, a configuration of the additive manufacturing process for at least one of a current layer or a subsequent layer based on the in situ insight augmented with the ex situ insight.

10. The method of claim 9, further including filtering the image data before applying the artificial intelligence model.

11. The method of claim 9, further including segmenting the image data to isolate a region of interest including melt pool image data before applying the artificial intelligence model to the region of interest.

12. The method of claim 9, further including training at least one of an entitlement model or an encoder model to form the artificial intelligence model.

13. The method of claim 9, further including:
training the artificial intelligence model using stored image data to develop the artificial intelligence model;
correlating the artificial intelligence model with the error; and
deploying the artificial intelligence model to process captured image data.

14. The method of claim 9, wherein modifying the energy density includes adjusting at least one of power, scan speed, focus, or spot size of an energy beam used during the additive manufacturing process.

15. An additive manufacturing apparatus comprising:
an energy source to melt material to form a component in an additive manufacturing process;
a camera aligned with the energy source to obtain image data of the melted material during the additive manufacturing process; and
a controller to control the energy source during the additive manufacturing process in response to processing of the image data, the controller to adjust control of the energy source based on a correction determined by:
compressing raw image data using at least one of a feature vector or a latent space that captures less than full image information, the raw image data captured by a camera during a build of a part in an additive manufacturing process and including an image of a melt pool of the additive manufacturing process during the build;
extracting image features from the compressed raw image data to represent the raw image data as a set of image features;
analyzing the set of image features to generate an ex situ insight;
applying an artificial intelligence model to the set of image features;
predicting an error in the additive manufacturing process using an output of the artificial intelligence model;
identifying an in situ insight related to adjusting the configuration of the apparatus including modifying an energy density of the additive manufacturing process during the build; and
compensating for the error by generating a correction to adjust a configuration of the energy source of the apparatus during the build for at least one of a current layer or a subsequent layer based on the in situ insight augmented with the ex situ insight while forming the component.

16. The apparatus of claim 15, wherein the controller is to filter and segment the image data to isolate a region of interest including the image of the melt pool before extracting the image features and applying the artificial intelligence model to the set of image features.

17. The apparatus of claim 15, wherein the artificial intelligence model includes an autoencoder.

18. The apparatus of claim 17, wherein the autoencoder is to reduce the image data to a feature vector and to reconstruct the image data from the feature vector.

19. The apparatus of claim 15, wherein the artificial intelligence model is trained using stored image data to develop the artificial intelligence model, correlate the artificial intelligence model with the error, and deploy the artificial intelligence model to process captured image data.

20. The apparatus of claim 15, wherein the controller is to compensate for the error by adjusting at least one of power, scan speed, focus, or spot size of the energy source during the additive manufacturing process.

21. The apparatus of claim 4, wherein the at least one of the entitlement model or the encoder model utilizes compressed image data to predict the error in the additive manufacturing process.

* * * * *